United States Patent
Jung et al.

(10) Patent No.: US 10,089,007 B2
(45) Date of Patent: Oct. 2, 2018

(54) ELECTRONIC APPARATUS INCLUDING A STRAP AND METHOD OF CONTROLLING THE SAME

(71) Applicant: Samsung Electronics Co., Ltd., Gyeonggi-do (KR)

(72) Inventors: Yeon-hee Jung, Seoul (KR); Ji-hyun Kim, Gyeonggi-do (KR); Yong-yeon Lee, Gyeonggi-do (KR); Eun-young Lim, Seoul (KR); Ji-yeon Kwak, Seoul (KR); Hae-yoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/184,541

(22) Filed: Jun. 16, 2016

(65) Prior Publication Data

US 2016/0370881 A1    Dec. 22, 2016

(30) Foreign Application Priority Data

Jun. 16, 2015 (KR) .......................... 10-2015-0085031

(51) Int. Cl.
| | | |
|---|---|---|
| *G06F 1/16* | (2006.01) | |
| *G06F 3/0488* | (2013.01) | |
| *G06F 3/16* | (2006.01) | |
| *G06F 3/041* | (2006.01) | |

(52) U.S. Cl.
CPC .......... *G06F 3/04883* (2013.01); *G06F 1/163* (2013.01); *G06F 1/169* (2013.01); *G06F 1/1694* (2013.01); *G06F 3/0414* (2013.01); *G06F 3/16* (2013.01)

(58) Field of Classification Search
None
See application file for complete search history.

(56) References Cited

U.S. PATENT DOCUMENTS

| | | |
|---|---|---|
| 7,583,508 B2 | 9/2009 | Hagiwara et al. |
| 2013/0163390 A1 | 6/2013 | Gossweiler, III et al. |
| 2014/0118270 A1 | 5/2014 | Moses et al. |
| 2014/0239065 A1 | 8/2014 | Zhou et al. |
| 2015/0015502 A1 | 1/2015 | Al-Nasser |
| 2015/0111558 A1 | 4/2015 | Yang |
| 2015/0154936 A1 | 6/2015 | Lee et al. |

(Continued)

FOREIGN PATENT DOCUMENTS

| | | |
|---|---|---|
| EP | 2 866 101 | 4/2015 |
| EP | 2 871 822 | 5/2015 |

(Continued)

OTHER PUBLICATIONS

International Search Report dated Sep. 13, 2016 issued in counterpart application No. PCT/KR2016/006387, 11 pages.

(Continued)

*Primary Examiner* — Joseph Haley
(74) *Attorney, Agent, or Firm* — The Farrell Law Firm, P.C.

(57) ABSTRACT

An electronic apparatus is provided. The electronic apparatus includes a strap, a sensor configured to measure a position and angle at which the strap is bent, a display, and a processor configured to display a user interface (UI) element corresponding to the measured position and angle on the display.

18 Claims, 52 Drawing Sheets

(56) References Cited

U.S. PATENT DOCUMENTS

| | | | | |
|---|---|---|---|---|
| 2015/0338979 | A1* | 11/2015 | Rhee | G06F 3/0414 |
| | | | | 345/174 |
| 2016/0299570 | A1* | 10/2016 | Davydov | G06F 1/163 |
| 2016/0334882 | A1* | 11/2016 | Jung | G06F 3/03 |
| 2017/0098435 | A1* | 4/2017 | Inagaki | G09G 5/37 |
| 2018/0113486 | A1* | 4/2018 | Chen | G06F 1/163 |

FOREIGN PATENT DOCUMENTS

| | | |
|---|---|---|
| KR | 10-1341717 | 12/2013 |
| WO | WO 2015/038684 | 3/2015 |

OTHER PUBLICATIONS

European Search Report dated May 22, 2018 issued in counterpart application No. 16811939.4-1221, 9 pages.

* cited by examiner

ELECTRONIC APPARATUS INCLUDING A STRAP AND METHOD OF CONTROLLING THE SAME

PRIORITY

This application claims priority to Korean Patent Application No. 10-2015-0085031, which was filed in the Korean Intellectual Property Office on Jun. 16, 2015, the entire disclosure of which is incorporated herein by reference.

BACKGROUND

1. Field of the Disclosure

The present disclosure relates generally to an electronic apparatus and a method of controlling the same, and more particularly, to an electronic apparatus including a strap and a method of controlling the electronic apparatus using various arrangement forms of the strap.

2. Description of the Related Art

Wearable computers included in clothing, etc., which are worn by a user, are generally formed as small-sized wearable computers, and thus, only have a small display screen area. Further, the number of buttons and the size of a screen, e.g., a touch screen, for manipulating a wearable apparatus, are limited, and thus, it is difficult to easily manipulate the wearable apparatus.

SUMMARY

Accordingly, an aspect of the present disclosure is to provide a method and electronic apparatus using various arrangements a strap for user interaction.

In accordance with an aspect of the present invention, an electronic apparatus is provided, which includes a strap; a sensor configured to measure a position and angle at which the strap is bent; a display; and a processor configured to display a user interface (UI) element corresponding to the measured position and angle on the display.

In accordance with another aspect of the present invention, an electronic apparatus is provided, which includes a strap, a sensor configured to measure a position and angle at which the strap is bent, a processor configured to detect a user interaction corresponding to the measured position and angle, and a communicator configured to transmit a control command corresponding to the detected user interaction to another electronic apparatus.

In accordance with another aspect of the present invention, a method is provided for controlling an electronic apparatus including a strap. The method includes measuring a position and angle at which the strap is bent; and displaying a user interface (UI) element corresponding to the measured position and angle.

In accordance with another aspect of the present invention, a method is provided for controlling an electronic apparatus including a strap. The method includes measuring a position and angle at which the strap is bent; determining if a user touch gesture is detected; and displaying a user interface (UI) element corresponding to the measured position and angle, only when the user touch gesture is detected.

BRIEF DESCRIPTION OF THE DRAWINGS

The above and/or other aspects, features, and advantages of certain embodiment of the present disclosure will be more apparent from the following detailed description taken in conjunction with the accompanying drawings, in which.

DETAILED DESCRIPTION OF EMBODIMENTS OF THE DISCLOSURE

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The terms used in the present disclosure are only used to describe the various embodiments, but are not intended to limit the scope of the disclosure.

For example, terms such as "first", "second", etc., may be used to distinguish components from each other, but the components are not limited by these terms.

Singular expressions also include plural meanings, unless expressly stated.

Terms such as "include" and "consist of" designate the presence of features, numbers, steps, operations, components, elements, or a combination thereof, but do not exclude the presence or possible addition of one or more other features, numbers, steps, operations, components, elements, or a combination thereof.

Herein, a "module" or a "unit" performs at least one function or operation, and may be implemented with hardware, software, or a combination of hardware and software. In addition, a plurality of modules or a plurality of units may be integrated into one module and may be implemented with at least one processor, unless a module or a unit has to be implemented with specific hardware.

Figure 1:
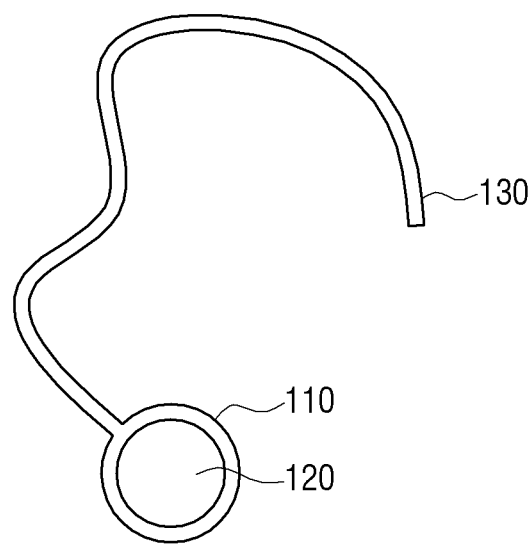
FIG. 1 illustrates an electronic apparatus including a strap according to an embodiment of the present disclosure.

FIG. 1 illustrates an electronic apparatus according to an embodiment of the present disclosure.

Referring to FIG. 1, the electronic apparatus includes a main body portion 110, which includes a display 120, and a strap 130 connected to the main body portion 110. For example, the electronic apparatus may be a smart pocket watch, which displays various information items via operative association with another apparatus, e.g., a mobile phone, and displays time information.

Various components of the electronic apparatus, except for the strap 130, may be included in the main body portion 110. The display 120 may provide various information items to a user. In addition, the display 120 may display a user interface (UI) element corresponding to bending information generated by the strap 130. For example, the UI information may include a text indicating preset information, an icon corresponding to specific information, widget information, a background image, etc. Further, the bending information may include information of a position, an angle, etc., for identifying the bending the strap 130.

The main body portion 110 may detect a user touch and generate touch information obtained by detecting the user touch and any other manipulation. Accordingly, a component outside the display 120 may be instrumentally referred to as the main body portion 110, but may be electrically referred to as a touch portion. That is, the main body portion 110 may be formed of a metallic material and may include a sensor for detection of static electricity, etc., of a user, attached thereto in order to function as the touch portion.

Additionally, the main body portion 110 may generate touch information from a touch on the display 120.

The touch information may be used to check whether bending information generated from the strap 130 is based on user intention. For example, when a user grabs the main body portion 110 and manipulates the strap 130 in order to input a specific command to the electronic apparatus, touch information and bending information may be generated together.

However, when only the strap 130 is deformed by a user movement (e.g., a wrist movement while walking) and no touch input is received, only bending information will be generated, and it may be determined that the manipulation of the strap 130 is unintended.

The strap 130 may include a flexible wire that is formed of a flexible material in order to be deformable and to maintain a shape of the strap, and fix the main body portion 110 to a specific body portion (e.g., a wrist or the neck) of the user. The flexible wire may be a freely bent or unbent wire and may be formed outside the strap 130 and/or inside the strap 130.

The strap 130 may use a soft rubber material (e.g., rubber, silicone, and/or urethane) on an external portion thereof in order to ensure soft contact against the user's body. In addition, the strap 130 may include materials with high elasticity (Ultem, polyetherimide (PEI), high elastic steel, Tetoron/Rayon (TR) 90, and/or polyolefin family self reinforced plastics (SRP) in order to ensure sufficient strain and restoring force.

The strap 130 may have various lengths, e.g., a minimum length for being able to wind around the user's wrist and a maximum length corresponding to a general length of a necklace. For example, when the strap 130 has a length of a necklace, the user may wear the electronic apparatus around the neck like a necklace. Alternatively, the electronic apparatus may be used like a wristwatch by winding the strap around the wrist a few times.

In addition, the strap 130 may have elasticity (or stretchable property) so as to be variously deformed according to user manipulation.

In addition, a flex sensor (or a bending sensor) for detection of a position and an angle at which the strap is bent may be included in the strap 130. Accordingly, the strap 130 may detect a form change based on a user manipulation. In addition, the position and the angle at which the strap is bent may be transmitted as bending information to the main body portion 110. Accordingly, the strap 130 and the main body portion 110 may be electrically connected, as well as physically connected to each other.

The flex sensor may be formed by arranging a plurality of bending resistor elements having different resistances according to a bending degree on a flexible substrate. The flex sensor may detect a region in which bending occurs and a bending degree at the corresponding region based on resistance (or a voltage value) transmitted from each bending resistor element.

In addition, a magnet or a hall sensor for detection of a direction with respect to the main body portion 110 may be disposed at a specific position in the strap 130. More specifically, the hall sensor may be disposed at a specific position in the strap 130 and the magnet may be disposed at a preset region of the main body portion 110. Alternatively, the magnet may be disposed at a specific position in the strap 130 and the hall sensor may be disposed at a preset region of the main body portion 110.

The hall sensor may detect a direction and amplitude of a magnetic field using a hall effect, whereby a voltage is generated in a perpendicular direction to current and the magnetic field, when the magnetic field is applied to a conductor with current flowing therein. The magnet may have magnetism and may be an electromagnet as well as a permanent magnet in reality.

In addition, an acceleration sensor for detection of a moving direction of a strap, a pressure sensor for detection of user grab with respect to the strap, etc., may be disposed in the strap 130.

As described above, an electronic apparatus according to an embodiment of the present disclosure may receive various inputs from a user based on a detected bending state of a strap. In addition, the electronic apparatus may provide various functions corresponding to various inputs.

Although a watch-type wearable electronic apparatus is illustrated herein, the electronic apparatus may be another type of device, e.g., a notebook personal computer (PC), a tablet PC, an MP3 player, a portable multimedia player (PMP), a cellular phone, etc., as long as a user is capable of moving the electronic apparatus or operating the electronic apparatus while moving.

Although FIG. 1 illustrates an electronic apparatus in which only the display 120 is disposed in the main body portion 110, a button for receiving a specific command, a photographing device for photography, a microphone for recording user voice, a speaker for outputting a preset sound, etc., may be additionally disposed in the main body portion 110.

Although FIG. 1 illustrates the strap 130 being connected to only one side of the main body portion 110, opposite ends of the strap 130 may be connected to the main body portion 110. In addition, the strap 130 and the main body portion 110 may be optionally connected or disconnected to or from each other, e.g., through a coupling device.

Figure 2:
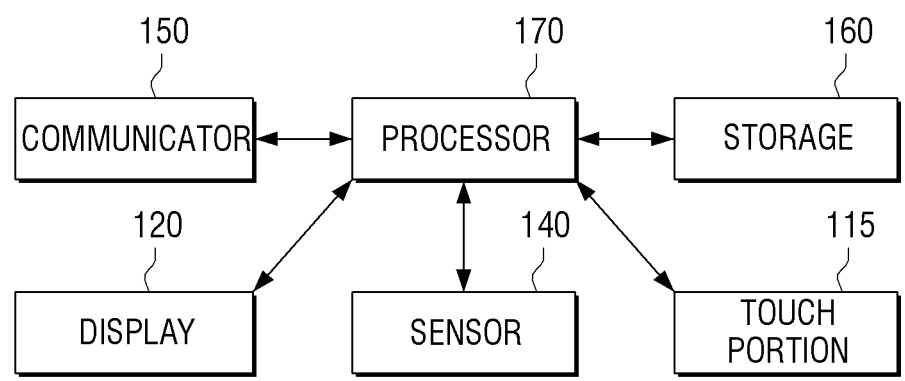
FIG. 2 illustrates components of the electronic apparatus of FIG. 1.

FIG. 2 illustrates components of the electronic apparatus of FIG. 1.

Referring to FIG. 2, the electronic apparatus includes a touch portion 115, the display 120, a sensor 140, a communicator 150, a storage 160, and a processor 170.

The touch portion 115 may detect a user touch on the display 120 and/or on the main body portion 110 that surrounds the display 120. That is, the touch portion 115 may include a first touch sensor for detecting a user touch on the main body portion 110 and a second touch sensor for detecting a user touch on the display 120.

Accordingly, the second touch sensor and the display 120 may constitute a touch screen as one physical component.

The electronic apparatus may be wearable on the wrist, such that a portion disposed in an opposite direction to the display 120 contacts the wrist. Therefore, the first touch sensor may detect a user touch on a partial lateral surface (an upper lateral surface, which is spaced apart from a lower surface by a predetermined distance) of the main body portion 110 and an upper surface on which a display is disposed.

The display 120 may display various information items, e.g., a UI element corresponding to a user interaction recognized by the processor 170.

The display 120 may be embodied as a touchscreen in which input and output functions are performed by one device.

The sensor 140 may measure a position and angle at which the strap 130 is bent, based on a signal transmitted from a flex sensor in the strap 130. The sensor 140 may measure a voltage value of each of a plurality of bending resistor elements in the flex sensor and detect information on a region in which bending occurs and a bending degree (or a bending angle) at the region.

In addition, the sensor 140 may detect a relative position between the main body portion 110 and the strap 130. For example, when a hall sensor is disposed at a preset position in the strap 130, a magnet may be disposed in a preset region of the main body portion 110 The sensor 140 may detect an arrangement between the main body portion 110 (or the display 120) and the strap 130 based on a signal transmitted from the hall sensor in the strap 130. Alternatively, a magnet may be disposed at a preset position in the strap 130 and a hall sensor may be disposed at a preset region of the main body portion 110.

Although the sensor 140 has been described above as detecting a relative position between the main body portion 110 and the strap 130, because a display is disposed in the main body portion 110, the sensor 140 may also detect a relative position between the display 120 and the strap 130.

In addition, the sensor 140 may detect at least one of direction and movement information of the electronic apparatus. For example, the sensor 140 may include a direction sensor for detection of a direction of the electronic apparatus, an acceleration sensor for detection of a movement direction and acceleration of the electronic apparatus, etc., and detect the moving direction, velocity, etc., of the electronic apparatus using the direction sensor and the acceleration sensor.

The communicator 150 connects the electronic apparatus with another terminal (or a host device) or the Internet, via a wireless or wired method. For example, the communicator 150 may transmit and receive data to and from an external device (e.g., a smartphone) via a wireless communication method such as Bluetooth, RF communication, WiFi, or near field communication (NFC). Examples of the transmitted and received data may be telephone streaming, music streaming data transmitted from a smartphone, and content information, such as weather information.

In addition, the communicator 150 may be connected to an external device (e.g., a PC) via a wired (or wireless) communication method and may input and output various data items. A port for a wired connection with an external device may be used to recharge a battery in the electronic apparatus.

The storage 160 may store a program for driving the electronic apparatus. The storage 160 may store a program as a combination of various commands for driving the electronic apparatus. For example, the program may include an operating system and an application program for providing a specific service.

In addition, the storage 160 may be embodied as a storage medium in the electronic apparatus and an external storage medium, e.g., a removable disk including a universal serial bus (USB) memory and a web server through a network.

The processor 170 may control each component included in the electronic apparatus. The processor 170 may determine an operating state (or an operating mode) of the electronic apparatus. For example, when there is no user input for a preset time period or an operation is not performed for a preset time period, the processor 170 may determine an operating state of the electronic apparatus as a power saving state (or a power saving mode).

In response to a user touch and bending information being input in a power saving state, data from an external device, or a wakeup command received through the communicator 150, the processor 170 may determine an operating state of the electronic apparatus as a normal state (or a normal mode or an active mode).

In addition, the processor 170 may determine an operational state of the electronic apparatus according to an arrangement of the display 120 and the strap 130. Here, the operational state may correspond to various functions supported by the electronic apparatus and may include a music reproduction state, a photograph state, a voice call state, working state, a workout state, a motion state, a festival state, etc.

For example, the music reproduction is for reproducing music by the electronic apparatus, the photographing state is for performing photograph using a photographing device installed in the electronic apparatus, the voice call state is for performing call using a speaker and a microphone included in the electronic apparatus, the working state is for providing general time information etc., the workout state is for providing information related to external activity, and the motion state is for providing information on the motion state when a user performs motion. In addition, the festival state is for displaying a preset graphics image in a specific event situation.

The arrangement of the display 120 (or the main body portion 110) and the strap 130 may include arrangement direction information, e.g., information on whether a preset region of a strap is disposed to the left or to the right of the display 120 and information detected in a corresponding arrangement direction, e.g., information on the number of straps.

The operational state of the electronic apparatus may be determined based on a wearing condition, a type of a pre-executed application, pre-registered user schedule information, etc., as well as an arrangement of a display and a strap.

In addition, the processor 170 may determine a wearing condition of the electronic apparatus, e.g., whether the electronic apparatus is worn as a necklace or a wristwatch, based on an arrangement condition of the strap 130 and the main body portion 110 (or the display 120). According to the determination result, the processor 170 may determine a display direction of a UI element and display the UI element in the determined display direction.

In addition, the processor 170 may control each component of the electronic apparatus corresponding to the determined operating state. For example, when an operating state of the electronic apparatus is determined as a power saving state, the processor 170 may control the display 120 not to display preset information.

In addition, the processor 170 may control the display 120 to display the UI element corresponding to a predetermined management state, in a normal state. In addition, in response to a bending state of a strap being change, the processor 170 may control the display 120 to display a UI element corresponding to a changed state of the strap. For example, the processor 170 may control the display 120 to display a UI element corresponding to a measured position and angle.

The processor 170 may detect a user interaction using at least one of bending information and relative positional information between the strap 130 and the display 120 according to a change in a shape of the strap 130.

In response to a user interaction being detected using the aforementioned bending information and relative positional information, the processor 170 may check that a user touch has been detected through the touch portion 115. In response to a user touch also being detected, the aforementioned change in the strap 130 may be determined as an intentional manipulation for a user input.

However, when a user touch is not detected, the processor 170 may recognize that a user did not intentionally manipulate the strap 130 for an input and may not perform the aforementioned interaction detection. That is, the processor 170 may not use the bending information, unless a user touch is also detected.

In addition, the processor 170 may control the display 120 to display a UI element corresponding to the detected user interaction. For example, when a user interaction corresponds to an input for releasing a power saving state, the processor 170 may control the display 120 to display a UI element (e.g., time information) corresponding to a current operational state.

As described above, the electronic apparatus may receive a user interaction using a bending state of a strap 130, such that a user may easily input various function commands.

Figure 3A:
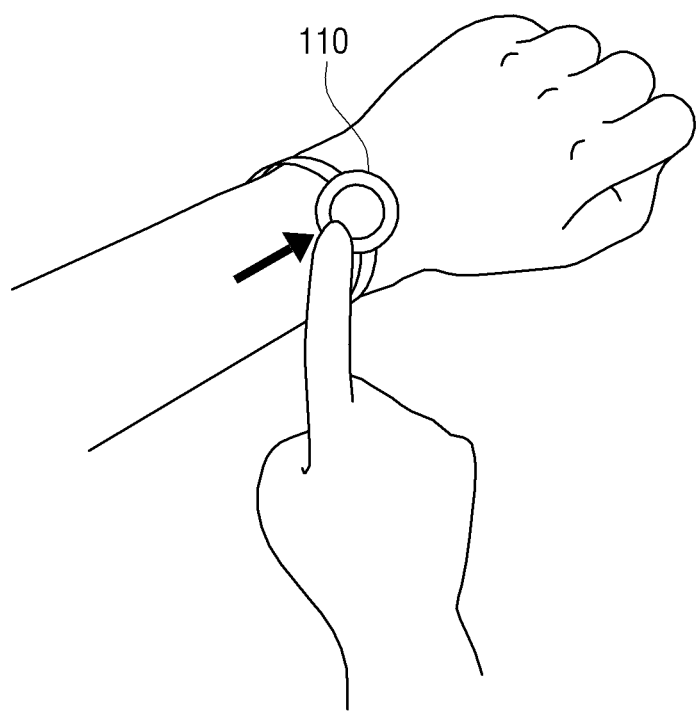
FIGS. 3A and 3B illustrate various inputs using a strap according to an embodiment of the present disclosure.
Figure 3B:
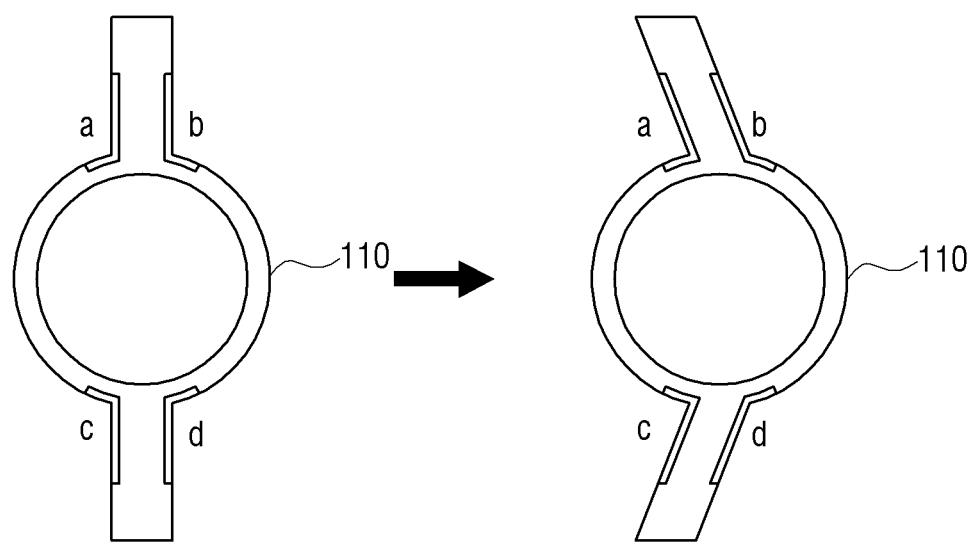

FIGS. 3A and 3B illustrate various inputs using a strap according to an embodiment of the present disclosure.

Referring to FIG. 3A, when a user pushes the main body portion 110 to the right, a bending state of a strap connected to the main body portion 110 may be changed as illustrated in FIG. 3B. For example, when the main body portion 110 is pushed to the right, angles of regions a and c are reduced and angles of regions b and d are increased.

Accordingly, when the electronic apparatus reads angle information of the four regions from a flex sensor, if the angles of the regions a and c are reduced and the angles of the regions b and d are increased, it may be determined that the user performs a first interaction, i.e., a push to the right.

The first user interaction may be mapped to various functions and may be operated as different functions according to the operating state and operational state of the electronic apparatus.

For example, when the electronic apparatus is in a power saving state, the first user interaction may be an input for converting the electronic apparatus into a normal state. In addition, when the electronic apparatus is in a normal state, the first user interaction may be an input for converting an operational state of the electronic apparatus into another operational state, a command for reproduction of next music, a command for movement to the right, etc.

Figure 4A:
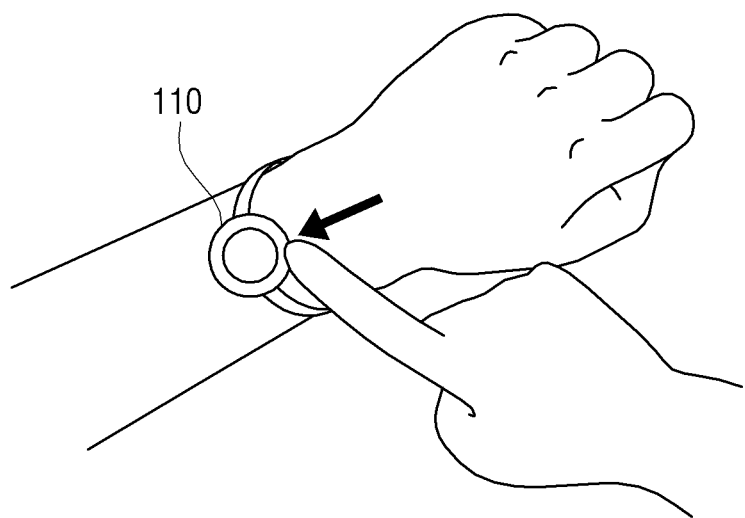
FIGS. 4A and 4B illustrate various inputs using a strap according to an embodiment of the present disclosure.
Figure 4B:
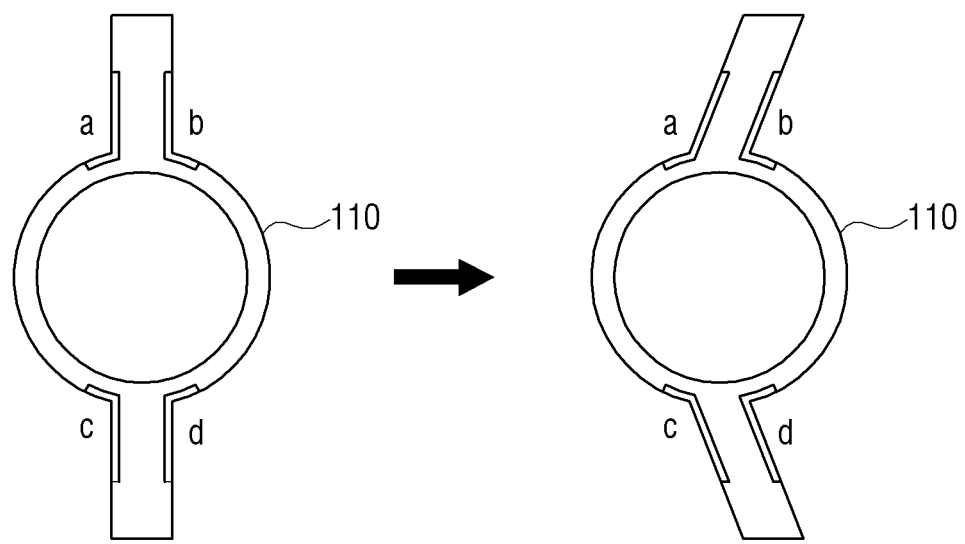

FIGS. 4A and 4B illustrate various inputs using a strap according to an embodiment of the present disclosure.

Referring to FIG. 4A, when the user pushes the main body portion 110 to the left, a bending state of a strap connected to the main body portion 110 may be changed as illustrated in FIG. 4B. For example, when the main body portion 110 is pushed to the left, angles of regions b and d are reduced and angles of regions a and c are increased.

Accordingly, when the electronic apparatus reads angle information of the four regions from a flex sensor, if the angles of the regions b and d are reduced and the angles of the regions a and c are increased, it may be determined that the user performs a second interaction, i.e., a push to the left.

The second user interaction may be mapped to various functions and may be operated as different functions according to the operating state and operational state of the electronic apparatus.

For example, when the electronic apparatus is in a normal state, the second user interaction may be an input for converting the electronic apparatus into a power saving state. In addition, when the electronic apparatus is in a normal state, the second user interaction may be an input for converting an operational state of the electronic apparatus into another operational state, a command for conversion into previous music, a command for movement to the left, etc.

After the user interactions illustrated in FIGS. 3A, 3B, 4A, and 4B, i.e., when the user releases the push or pull of the main body portion 110, the strap 130, according to its elasticity, moves in an opposite direction back to its original position.

However, as described above, because a change in the strap arrangement is used while a user also touches the main body portion 110 or the display 120, a restoration movement, i.e., the bounce back, according to elasticity of a strap while the user does not touch the main body portion 110 will not be recognized as a user interaction.

Although FIGS. 3A, 3B, 4A, and 4B illustrates the electronic apparatus being wound around the user's wrist, the electronic apparatus may also be embodied in the form of a necklace.

Figure 5A:
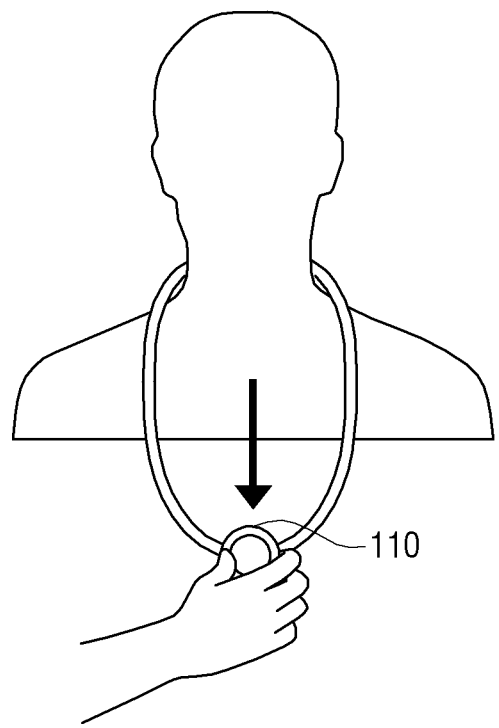
FIGS. 5A and 5B illustrate various inputs using a strap according to an embodiment of the present disclosure.
Figure 5B:
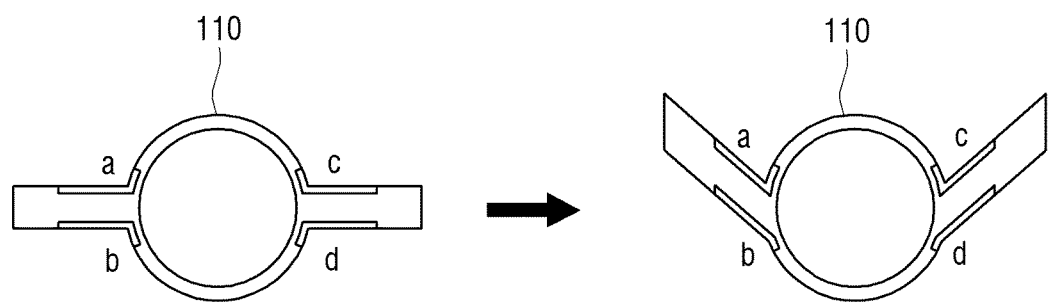

FIGS. 5A and 5B illustrate various inputs using a strap according to an embodiment of the present disclosure.

Referring to FIG. 5A, when the user pulls the main body portion 110 in a downward direction while putting on the electronic apparatus in the form of a necklace, a bending state of a strap connected to the main body portion 110 may be changed as illustrated in FIG. 5B.

When the main body portion 110 is pulled in the downward direction, angles of regions a and c are reduced and angles of regions b and d are increased. Accordingly, when the electronic apparatus reads angle information of the four regions from a flex sensor, if the angles of the regions a and c are reduced and the angles of the regions b and d are increased, it may be determined that the user performs a third interaction, i.e., a pull down.

As can be seen in a comparison of FIGS. 3B and 5B, the angle change of the third interaction may be the same as the angle change of the first interaction.

Accordingly, in order to differentiate the first interaction and the third interaction from each other, the electronic apparatus may determine a wearing condition through a relative position between the main body portion 110 and the strap 130, e.g., from the hall sensor, and differentiate the two interactions according to the wearing condition.

The third user interaction may be mapped to various functions and may be operated as different functions according to the operating state and operational state of the electronic apparatus. For example, when the electronic apparatus is in a power saving state, the third user interaction may be an input for converting the electronic apparatus into a normal state. In addition, in response to a phone call being received, the third user interaction may be used as an input for answering the phone call.

Figure 6A:
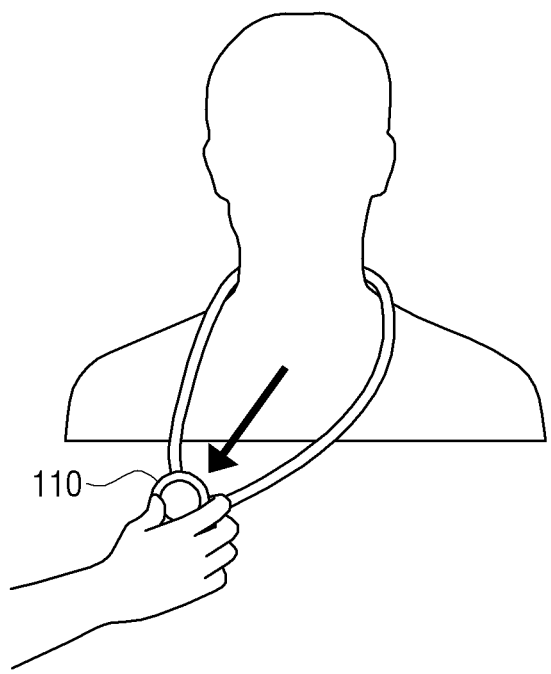
FIGS. 6A and 6B illustrate various inputs using a strap according to an embodiment of the present disclosure.
Figure 6B:
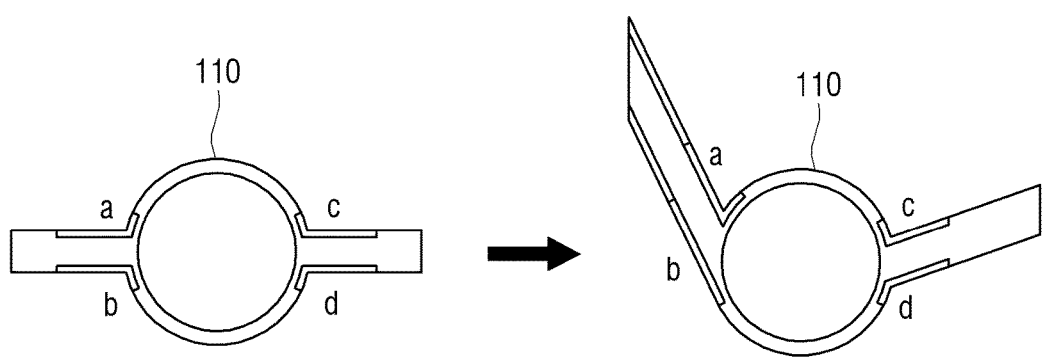

FIGS. 6A and 6B illustrate various inputs using a strap according to an embodiment of the present disclosure.

Referring to FIG. 6A, when the user pulls the main body portion 110 in a lower-left direction while putting on the electronic apparatus in the form of a necklace, a bending state of a strap connected to the main body portion 110 may be changed as illustrated in FIG. 6B.

When the main body portion 110 is pulled in a downward direction, angles of regions a and c are reduced and angles of regions b and d are increased. In addition, the reduced angles of the regions a and c are different from each other and the increased angles of the regions b and d are be different from each other. Accordingly, when the electronic apparatus reads angle information of the four regions from a flex sensor, if the angles of the regions a and c are reduced and the angles of the regions b and d are increased, and the angle of the region a reduces more than the angle of the region c, it may be determined that the user performs a fourth interaction, i.e., a pull down to the left.

The fourth user interaction may be mapped to various functions and may be operated as different functions according to the operating state and operational state of the electronic apparatus.

FIGS. 7 to 12 illustrate various inputs based on an arrangement between a strap and a main body portion of an electronic apparatus according to an embodiment of the present disclosure.

Figure 7:
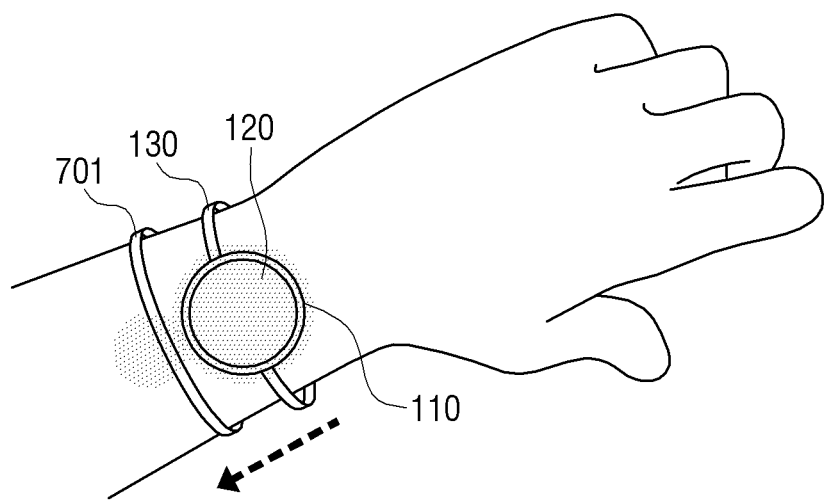
FIGS. 7 to 12 illustrate various inputs based on an arrangement between a strap and a main body portion of an electronic apparatus according to an embodiment of the present disclosure.

Specifically, FIG. 7 illustrates a first arrangement condition, in which an additional strap 701 is disposed to the left of the main body portion 110.

Referring to FIG. 7, when a main body portion 110 is positioned on the user wrist and the additional strap 701 is positioned to the left of the main body portion and a hall sensor is disposed in the additional strap 701, the hall sensor may provide information indicating that the electronic apparatus is positioned to the right. Accordingly, through the information, the electronic apparatus may recognize that the additional strap 701 is positioned to the left of the main body portion 110.

Here, the additional strap 701 may be a separate strap that is physically separated from the electronic apparatus. Alternatively, the additional strap 701 may be a partial region of the strap 130, which is positioned next to the electronic apparatus by wrapping the strap 130 around the wrist multiple times.

The first arrangement condition may be mapped to various management states, and for example, may be used as an office state indicating time information. For example, when a user pushes the additional strap 701 to the right or left in the first arrangement condition, a UI element indicating the time information may be displayed on the display 120.

Figure 8:
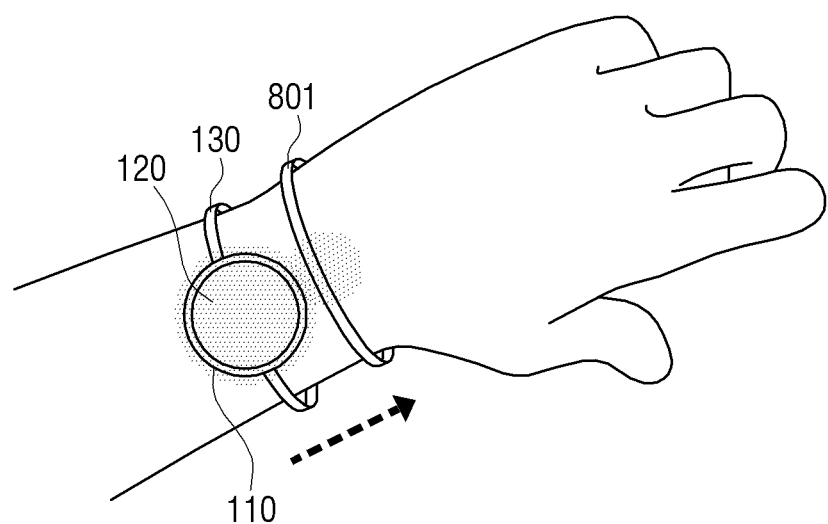

FIG. 8 illustrates a second arrangement condition in which an additional strap 801 is disposed to the right of the main body portion 110.

Referring to FIG. 8, when the main body portion 110 is positioned on the user's wrist and the additional strap 801 is positioned to the right of the main body portion and a hall sensor is disposed in the additional strap 801, the hall sensor may provide information indicating that the electronic apparatus is positioned to the left. Accordingly, through the information, the electronic apparatus may recognize that the additional strap 801 is positioned to the right of the main body portion 110.

The second arrangement condition may be mapped to various management states, and for example, may be used as a motion state. For example, when a user pushes the additional strap 801 to the right or left in the second arrangement condition, a UI element indicating the motion state may be displayed on the display 120.

Figure 9:
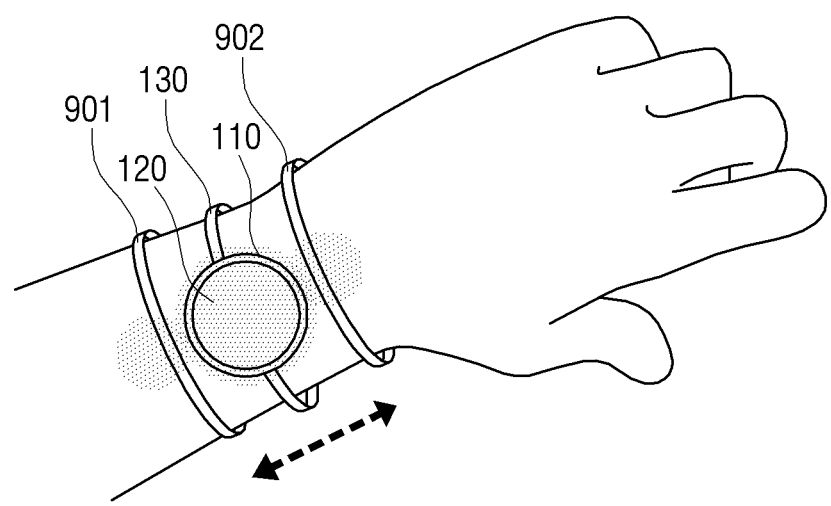

FIG. 9 illustrates a third arrangement condition in which additional straps 901 and 902 are disposed to the left and right, respectively, of the main body portion 110.

Referring to FIG. 9, when the main body portion 110 is positioned on the user wrist and the additional straps 901 and 902 are positioned to the left and right of the main body portion 110, and a hall sensor is disposed in the strap 130, the hall sensor may provide a plurality of information items indicating that the electronic apparatus is positioned to the left of the additional strap 902 and to right of the additional strap 901. Accordingly, through the information, the electronic apparatus may recognize that the two additional straps 901 and 902 are positioned to the left and right of the main body portion 110, respectively.

The third arrangement condition may be mapped to various management states, and for example, may be used as a workout state. For example, when a user pushes the strap 130 to the right or left in the third arrangement condition, a UI element indicating a music reproduction state, a map display state, or the like may be displayed on the display 120.

Figure 10:
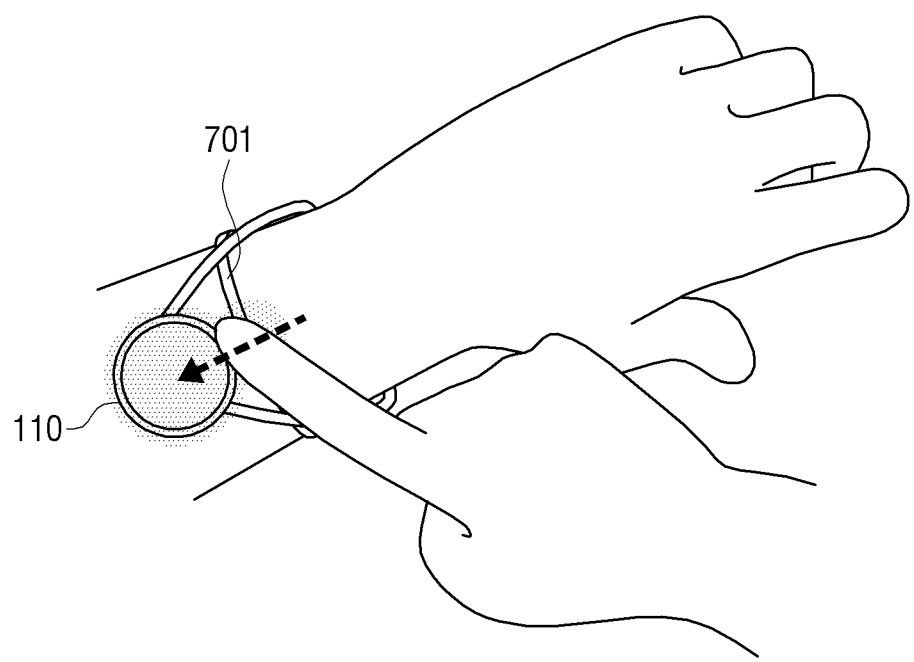
Figure 11:
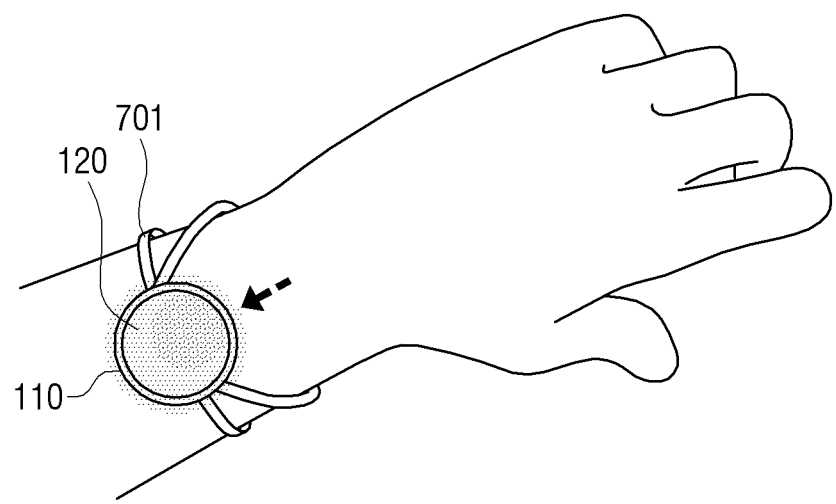
Figure 12:
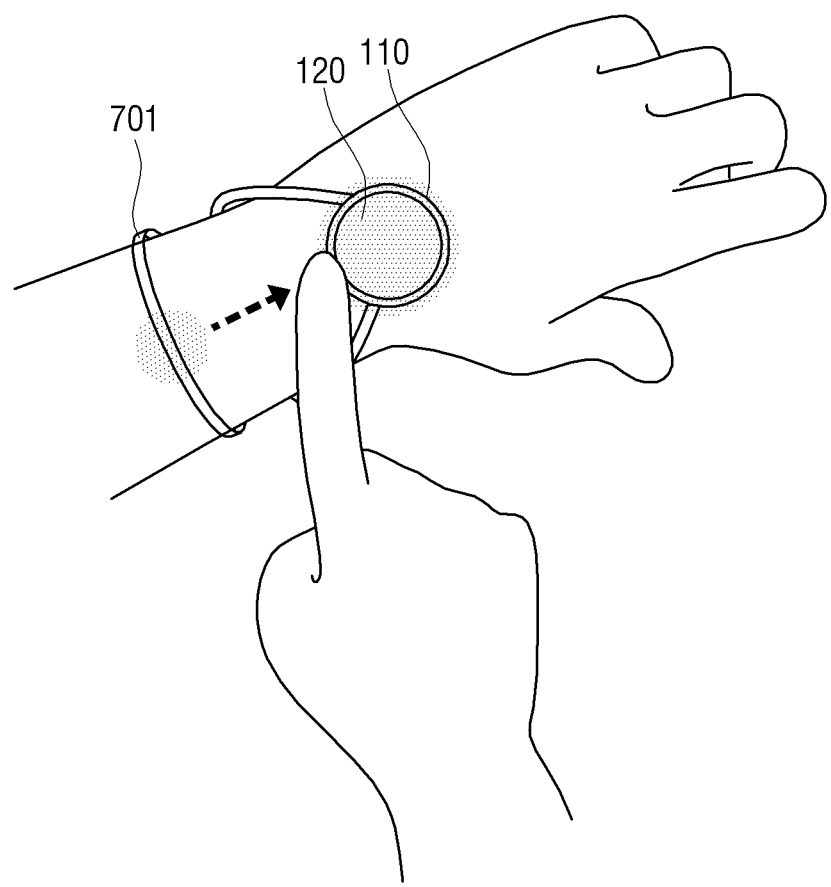

FIGS. 10 to 12 illustrate various user interactions in the first arrangement condition of FIG. 7.

Specifically, FIG. 10 illustrates a pushing or pulling of the main body portion 110 (or the display 120) by a user.

Referring to FIG. 10, when a user pushes the main body portion 110 to the right while the additional strap 701 is positioned to the left of the main body portion 110, intensity of a magnetic field detected by a hall sensor may be increased.

In addition, when the user pushes the main body portion 110 to the left compared with the additional strap 701, a direction of the detected magnetic field is reversed. For example, when a hall sensor is disposed in the main body portion 110, the hall sensor may detect a magnetic field from a left side in the first arrangement condition. In this state, when the main body portion 110 is moved as illustrated in FIG. 10, the hall sensor may detect that an intensity of the detected magnetic field is increased and then a direction of the magnetic field is changed. Accordingly, through the change in information of a magnetic field, the electronic apparatus may determine that the user performs a pushing or pulling of the main body portion 110.

When the interaction is input, the electronic apparatus may determine that a user sets a manner mode, or the interaction may be used as a command for linking the electronic apparatus with another apparatus.

FIG. 11 illustrates an operation when a pushing or pulling of the main body portion 110 (or the display 120) to the left by a user is maintained for preset time.

Referring to FIG. 11, when the user pushes the main body portion 110 to the left while an additional strap 701 is positioned to the left of the main body portion 110, a direction of a magnetic field detected by a hall sensor is reversed.

For example, when a hall sensor is disposed in the main body portion 110, the hall sensor may detect a magnetic field from a left side in a first arrangement condition. In this case, as illustrated in FIG. 11, when the main body portion 110 is moved and the main body portion 110 remains on the additional strap 701, intensity of a magnetic field detected by the hall sensor is at its highest, and the electronic apparatus may determine that the user performs an interaction through the change in information of the magnetic field.

FIG. 12 illustrates a pushing or pulling of the main body portion 110 (or the display 120) to the right by a user.

Referring to FIG. 12, when the user pushes the main body portion 110 to the right, while the additional strap 701 is positioned to the left of the main body portion 110, a direction of a magnetic field detected by a hall sensor may be maintained or intensity of the magnetic field may be reduced.

For example, when the hall sensor is disposed in the main body portion 110, the hall sensor may detect a magnetic field from a left side in a first arrangement condition. As illustrated in FIG. 12, when the main body portion 110 is moved in this state, the hall sensor may detect the reduced magnetic field from a left side and, accordingly, the electronic apparatus may determine that a user performs an interaction through the change in information of the magnetic field.

Although FIGS. 3 to 6 describe an interaction being determined based on bending information, and FIGS. 10 to 12 describe an interaction being determined based on a direction of a magnetic field detected by a hall sensor, an interaction of the user may also be detected using both the bending information and the information of a magnetic field.

Figure 13A:
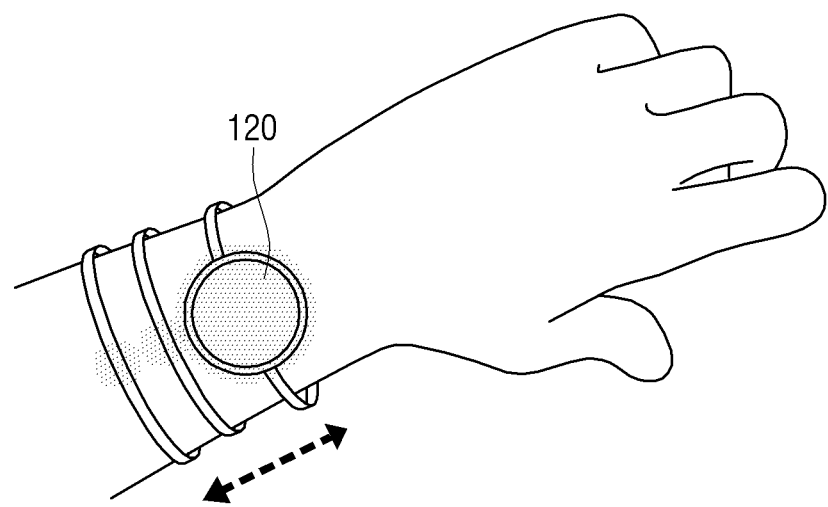
FIGS. 13A and 13B illustrate a method of identifying a wearing condition based on an arrangement of a strap and a main body portion of an electronic apparatus according to an embodiment of the present disclosure.
Figure 13B:
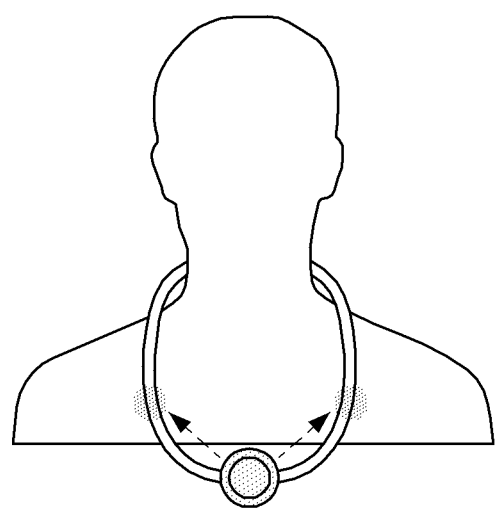

FIGS. 13A and 13B illustrate a method of identifying a wearing condition based on an arrangement of a strap and a main body portion of an electronic apparatus according to an embodiment of the present disclosure.

Referring to FIG. 13A, when the electronic apparatus is wound around the wrist multiple times and a hall sensor is disposed in a main body portion, two magnetic fields detected by the hall sensor may have the same direction.

However, as illustrated in FIG. 13B, when the electronic apparatus is put on a user in the form of a necklace, two magnetic fields detected by the hall sensor may have upper-right and upper-left directions.

Accordingly, the electronic apparatus may determine whether an electronic apparatus is wound around the wrist or is put on a user in the form of a necklace, based on a direction of a magnetic field detected by a hall sensor.

Based on the determination of how the electronic apparatus is being worn, the electronic apparatus may then determine a display direction of a display. For example, as illustrated in FIG. 13A, determining that the electronic apparatus is worn as a wristwatch, the electronic apparatus may display text perpendicular to an arrangement direction of the strap.

However, as illustrated in FIG. 13B, determining that the electronic apparatus is worn as a necklace, the electronic apparatus may display text in parallel to an arrangement direction of the strap.

Accordingly, the electronic apparatus may determine a gaze direction of a user based on a direction of a magnetic direction and arrange a text according to the determined gaze direction. For example, in FIG. 13B, the electronic apparatus may arrange the text such that a reading direction of the text is from a right side to a left side.

Figure 14A:
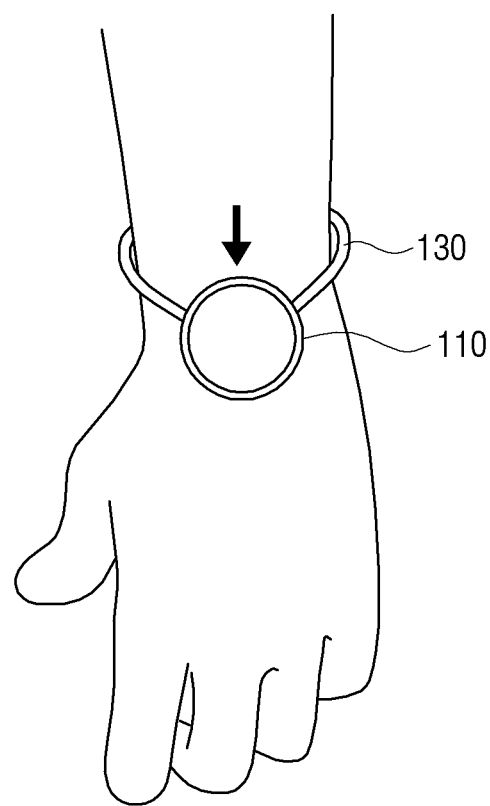
FIGS. 14A and 14B illustrate a method of determining an intentional or unintentional interaction of a user according to an embodiment of the present disclosure.
Figure 14B:
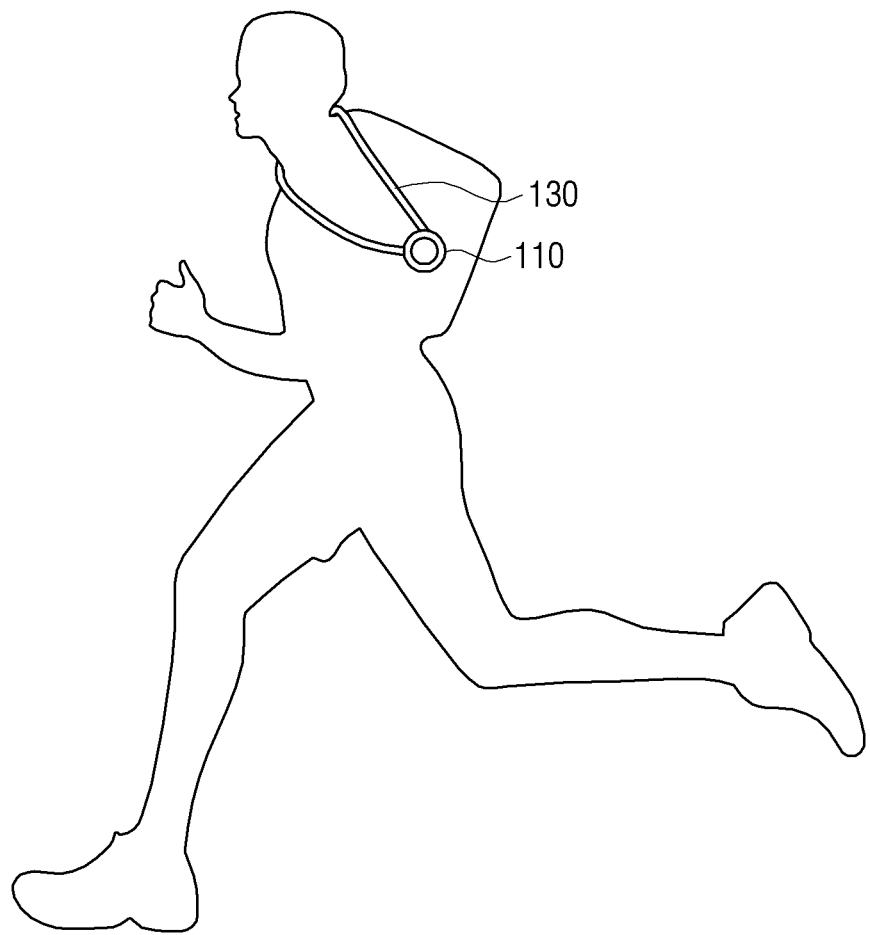

FIGS. 14A and 14B illustrate a method of determining an intentional or unintentional interaction of a user according to an embodiment of the present disclosure. Specifically, because the electronic apparatus is a wearable device, the electronic apparatus may be unintentionally operated while being worn by a user.

Referring to FIG. 14A, while the user is walking, the main body portion 110 and the strap 130 may move in the directions as illustrated in FIGS. 3A and 4A. In addition, as illustrated in FIG. 14B, while the user is running, the main body portion 110 and the strap 130 may move in the directions as illustrated in FIGS. 5A and 6A. However, these movements of the electronic apparatus are not intended by the user, and thus, if the electronic apparatus operates according to these movements, this would unnecessarily waste power and likely cause errors.

Figure 15:
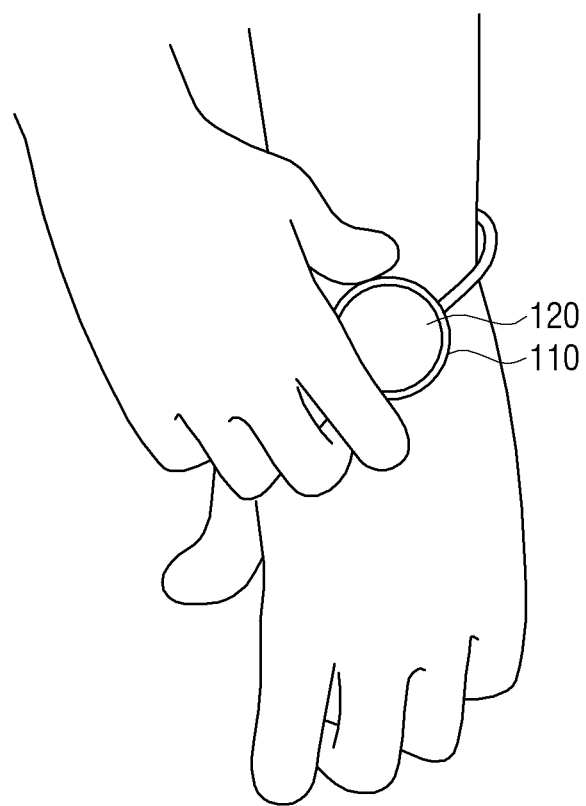
FIG. 15 illustrates a method of determining an intentional or unintentional interaction of a user according to an embodiment of the present disclosure.

FIG. 15 illustrates a method of determining an intentional or unintentional interaction of a user according to an embodiment of the present disclosure.

Referring to FIG. 15, intended manipulations of the electronic apparatus may be ensured by identifying the manipulating of the main body portion 110 or the display 120 by the user's hand. Accordingly, based on whether or not the user touches the main body portion 110 or the display 120, the electronic apparatus may detect and whether the manipulation of the electronic apparatus, e.g., bending information, is intended or not.

FIGS. 16A to 16C and 17A to 17C illustrate various operating states according to an arrangement of a display of an electronic apparatus according to an embodiment of the present disclosure.

Figure 16A:
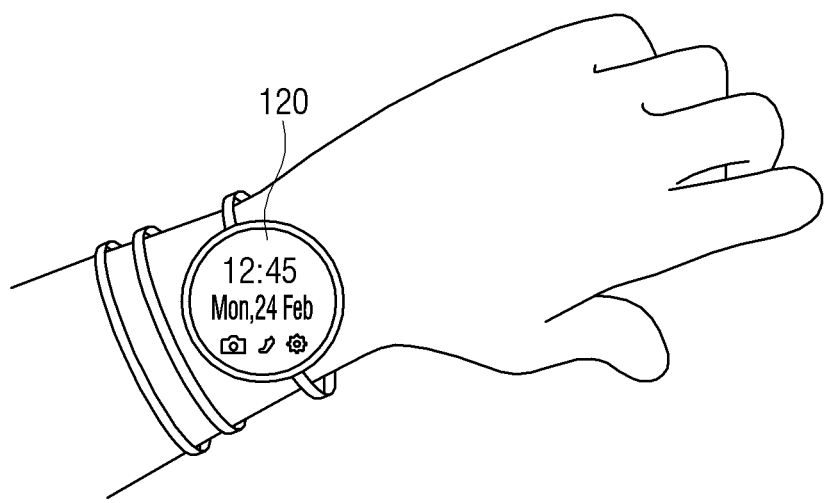
FIGS. 16A to 16C and 17A to 17C illustrate various operating states according to an arrangement of a display of an electronic apparatus according to an embodiment of the present disclosure.

Specifically, FIG. 16A illustrates an example of a user interface window displayed in an office state.

Referring to FIG. 16A, the display 120 in the office state displays basic time information, day of the week, etc.

Figure 16B:
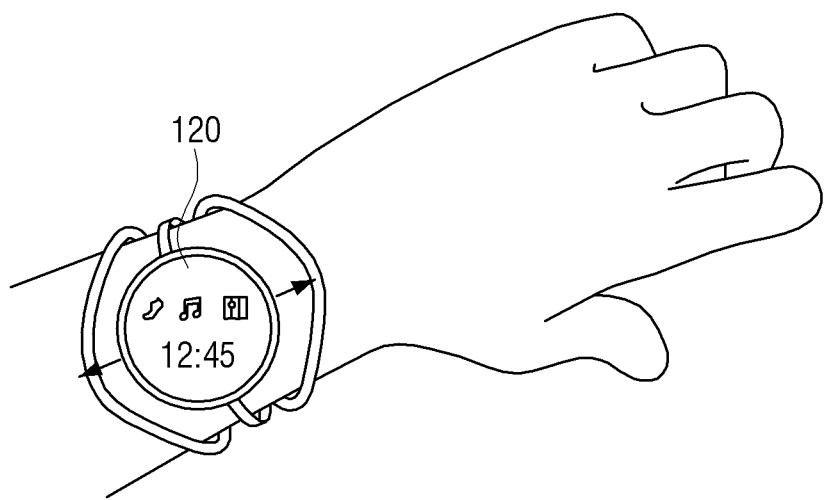

FIG. 16B illustrates an example of a user interface window displayed in a workout state.

Referring to FIG. 16B, the display 120 displays, in the workout state, information that is likely to be used when a user is in an external activity, such as sports, music, and a map.

Figure 16C:
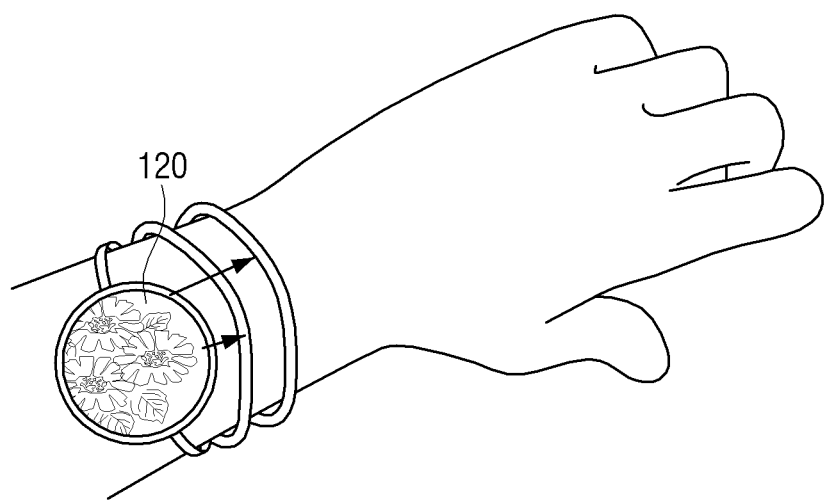

FIG. 16C illustrates an example of fancy graphic effects that match an atmosphere in a festival state.

Referring to FIG. 16C, such a mode may be executed when a user performs a user gesture such as high-five or when the user arranges an electronic apparatus according to an arrangement form. Whether the high-five is performed may be determined using an acceleration sensor and a direction sensor.

Figure 17A:
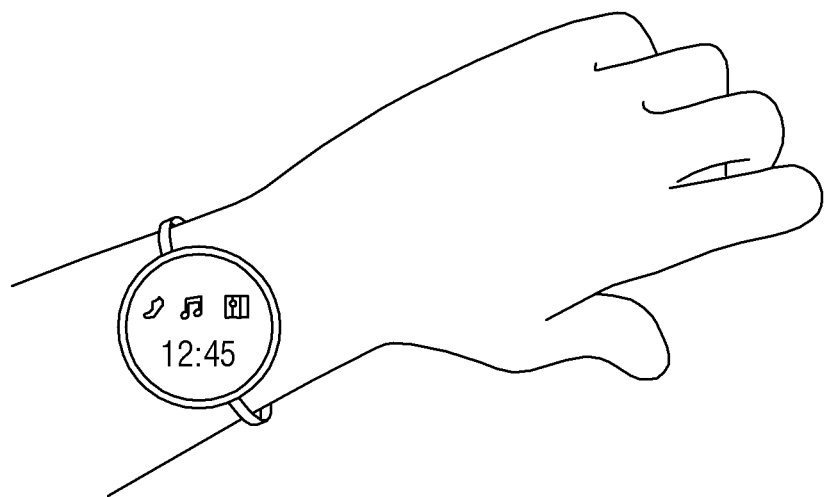
Figure 17B:
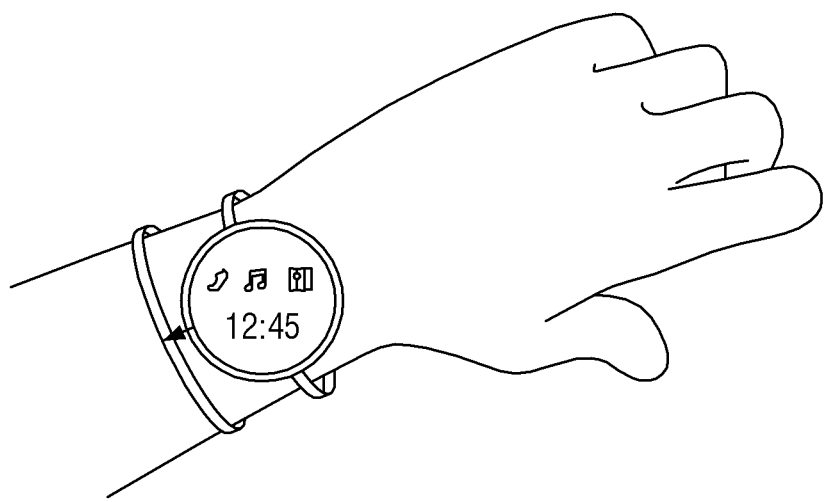
Figure 17C:
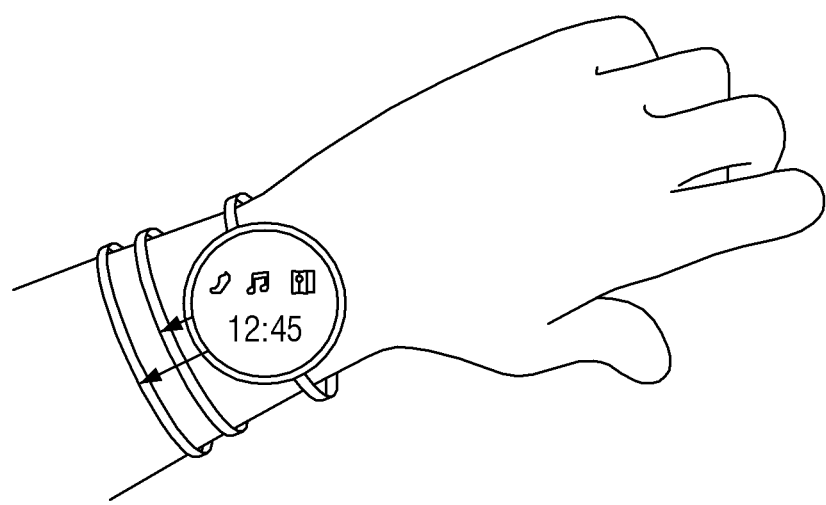

Specifically, FIG. 17A illustrates an electronic apparatus put on a user's wrist with one strap, FIG. 17B illustrates an electronic apparatus put on a user's wrist with two straps, and FIG. 17C illustrates an electronic apparatus put on a user's wrist with three straps. Although FIGS. 17A to 17C are described having a different number of straps, in reality, the actual number of straps may be one, but the one strap may be wrapped around the user's wrist multiple times.

Figure 18:
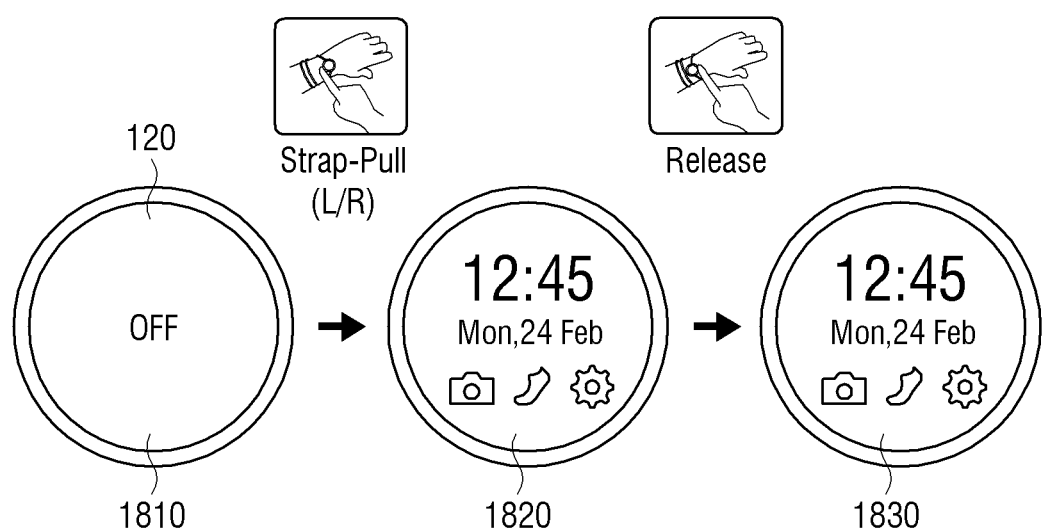
FIGS. 18 to 20 illustrate user interface windows that correspond to user interactions according to an embodiment of the present disclosure.
Figure 19:
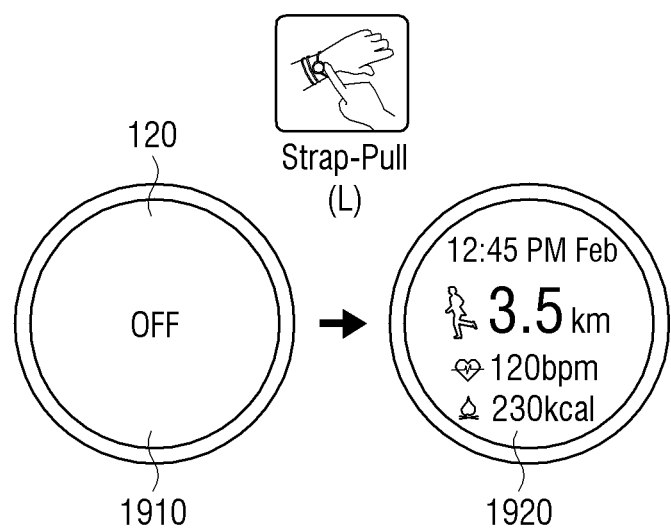
Figure 20:
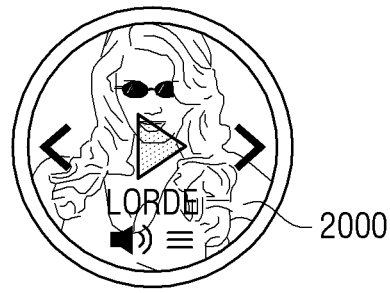

FIGS. 18 to 20 illustrate examples of a UI windows that correspond to user interactions according to an embodiment of the present disclosure.

Referring to FIG. 18, in a power saving state, a user interface window 1810 does not display any UI element. Specifically, when the electronic apparatus is in a power saving state, the display 120 may be in a power-off state.

In this state, when a user interaction, e.g., as illustrated in FIG. 3A or FIG. 4A is detected, a user interface window 1820 may display a UI element corresponding to a current operational state. For example, when the current operational state of the electronic apparatus is an office state, the user interface window 1820 displays a UI element corresponding to the office state, which includes a time UI, a day UI, and a basic menu UI.

When the user completes the user interaction, the electronic apparatus may return to the previous interaction direction according to elasticity of the strap. However, because the movement is performed without any user touch, the return movement is disregarded, and a user interface window 1830 displays the same UI element as the UI element displayed in the previous operation.

When a new interaction is not received from a user for a preset time period, a current state may be converted back into a power saving state as in the user interface window 1810.

FIG. 19 illustrates an example of a user interface displayed when a user interaction is input in a motion state according to an embodiment of the present disclosure.

Referring to FIG. 19, a user interface window 1910 does not display any UI element, as the electronic apparatus is in a power saving state and the display 120 is also in a power-off state.

When an interaction as illustrated in FIG. 3A or FIG. 4A is detected, a user interface window 1920 displays a UI element corresponding to a current operational state. For example, when the current operational state of the electronic apparatus is a motion state, the user interface window 1920 displays a time UI, a day UI, a running distance UI, a heart rate UI, and a calorie expenditure UI.

FIG. 20 illustrates an example of a user interface when a user interaction is input in a music reproduction state according to an embodiment of the present disclosure.

Referring to FIG. 20, the user interface window 1920 displays a UI element corresponding the current operational state of music reproduction, i.e., a UI for receiving information on currently reproduced content and a control command related to music reproduction.

Figure 21:
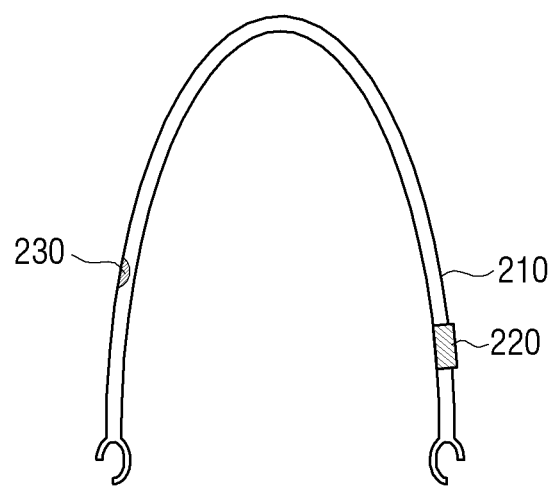
FIG. 21 illustrates an electronic apparatus according to an embodiment of the present disclosure.

FIG. 21 illustrates an electronic apparatus according to an embodiment of the present disclosure.

Referring to FIG. 21, the electronic apparatus includes a strap 210, a display 220, and a sound inputter and outputter 230, which is disposed on the strap 210.

The strap 210 may include a flexible wire that is formed of a deformable flexible material and maintains a strap shape in order to be fixed to a specific body part (e.g., the wrist or neck) of a user. The flexible wire may be a freely bent or unbent wire and may be formed outside the strap 210 and/or inside the strap 210.

In addition, the strap 210 may have elasticity (or stretchable property) in order to be variously deformed according to user manipulation.

The strap 210 may have various lengths, e.g., a minimum length for surrounding the user's wrist, and a maximum length corresponding to a general length of a necklace. For example, when the strap 210 has the same length as a necklace, the user wear the electronic apparatus around the neck. In addition, the electronic apparatus may be wound around the wrist a number of times.

In addition, a flex sensor (or a bending sensor) for detection of a position and an angle at which the strap is bent may be included in the strap 210. Accordingly, the strap 210 may detect a form change according to user manipulation.

The flex sensor may be formed by arranging a plurality of bending resistor elements having different resistances according to a bending degree on a flexible substrate and may detect a region in which bending occurs and a bending degree at the corresponding region based on resistance (or a voltage value) transmitted from each bending resistor element.

In addition, a magnet or a hall sensor for detection of whether the ends of a strap are connected to each other may be disposed at a specific position in the strap 210. For example, the hall sensor and the magnet may be arranged at the opposite ends of the strap 210, respectively.

The hall sensor detects a direction and amplitude of a magnetic field using a hall effect, whereby a voltage is generated in a perpendicular direction to current and the magnetic field when the magnetic field is applied to a conductor with current flowing therein.

In addition, an acceleration sensor for detection of a moving direction of a strap, a pressure sensor for detection of user grab with respect to the strap, etc., may be included in the strap 210.

The display 220 is disposed on the strap 210, and provides less information on whether the electronic apparatus than the display 120.

The sound inputter and outputter 230 may include at least one of a speaker and a microphone in order to output sound or to record sound.

In addition, a surface of the strap 210 may detect a user touch, e.g., using a touch sensor disposed on an entire region of the strap 210 or disposed on only a preset partial region.

Although a wearable apparatus with a single strap is illustrated in FIG. 21, similar to FIG. 1, the wearable apparatus may be combined with another apparatus having a display.

Alternatively, a button for receiving a specific command may be further disposed in the strap 210 and a photographing device for photography, various sensors for detection of a direction of movement of a strap, etc., may be further disposed in the strap 210.

Further, the display 220 and the sound inputter and outputter 230 may be omitted. That is, the electronic apparatus may include only components of a sensor and components for communication with an external device.

Figure 22:
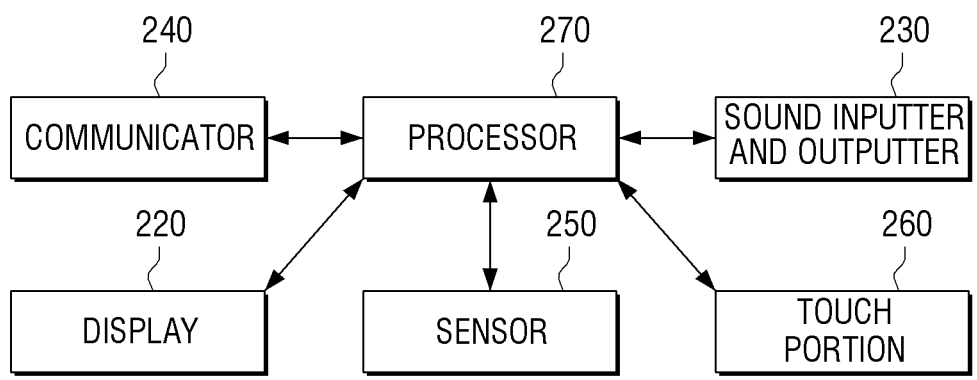
FIG. 22 illustrates components of the electronic apparatus of FIG. 21.

FIG. 22 illustrates components of the electronic apparatus of FIG. 21.

Referring to FIG. 22, the electronic apparatus includes the display 220, the sound inputter and outputter 230, a communicator 240, a sensor 250, a touch portion 260, and a processor 270.

The display 220 displays various information. The display 220 may include a light emitting diode (LED) for displaying an operating state of the electronic apparatus or an error state (charging required, being charged, etc.) using different color light.

As described above, the sound inputter and outputter 230 may include a microphone and/or a speaker. The microphone may be attached to a preset region of a strap and may record a sound in order to generate voice data, which may be transmitted to an electronic apparatus through the communicator 240.

The speaker may output voice and voice data received through the communicator 240 as a sound wave.

The communicator 240 connects the electronic device to another terminal apparatus (or a host apparatus) or the Internet, using a wireless or wired method. In detail, the communicator 240 may transmit and receive data to and from an external device (e.g., a smartphone) via a wireless communication method such as Bluetooth, RF communication, WiFi, and NFC. The transmitted and received data may be telephone streaming, music streaming data transmitted from another device, or content information such as weather information.

In addition, a port for wired connection with an external device may be used to recharge a battery in the electronic apparatus.

The sensor 250 may measure a position and angle at which the strap 210 is bent, based on a signal transmitted from the flex sensor in the strap 210. More specifically, the sensor 250 may measure a voltage value of each of a plurality of bending resistor elements in the flex sensor and detect a region in which bending occurs and a bending degree at the region.

In addition, the sensor 250 may detect a connection state of ends of the strap 210. For example, a hall sensor and a magnet may be arranged at preset positions (e.g., opposite ends) in the strap 210, respectively. The sensor 250 may determine whether the opposite ends of the strap 210 are connected, based on intensity of a magnetic field detected by a hall sensor.

In addition, the sensor 250 may detect at least one of direction and movement information of the electronic apparatus. For example, the sensor 250 may include a direction sensor for detection of a direction of the electronic apparatus, an acceleration sensor for detection of a movement direction and acceleration of the electronic apparatus, etc., and detect the moving direction, velocity, etc., of the electronic apparatus using the direction sensor and the acceleration sensor.

The sensor 250 may include a plurality of pressure sensors for detecting a user grab at a preset specific region. The sensor 250 may include a plurality of acceleration sensors in order to detect a manipulation direction with respect to a plurality of preset specific regions.

The touch portion 260 may detect a user touch on the strap 210.

The processor 270 may control each component of the electronic apparatus. The processor 270 may determine a wearing condition of a strap according to an arrangement form of the strap. For example, the wearing condition of the strap may be determined according to whether or not opposite ends of the strap 210 are connected to each other. When the opposite ends are connected to each other, the strap may be determined to be put on the user's wrist. However, when the opposite ends of the strap 210 are not connected to each other, the strap may be determined to be put on the user neck.

In addition, the processor 270 may control each component of the electronic apparatus according to the determined operating state. For example, in response to a bending state of the strap being changed, the processor 270 may detect a user interaction corresponding to the changed state of the strap 210.

In addition, in response to a user interaction being detected using the aforementioned bending information, the processor 270 may check that a user touch has been detected through the touch portion 260. In response to a user touch being detected, the aforementioned change in a strap 210 may be determined as manipulation for a user interaction. However, when a user touch is not detected, the processor 270 may recognize that a user did not intentionally manipulate the strap 210 for an interaction, and therefore disregard the aforementioned interaction detection.

As described above, the processor 270 may a user touch detection to ensure that detected movement of the strap 210 is an intended manipulation by the user.

In addition, the processor 270 may control the communicator 240 to transmit a control command corresponding to the detected user interaction to another electronic apparatus.

As described above, the electronic apparatus may receive a user interaction using a bending state, etc., of a strap 210, and thus, a user may easily input various function commands.

Figure 23:
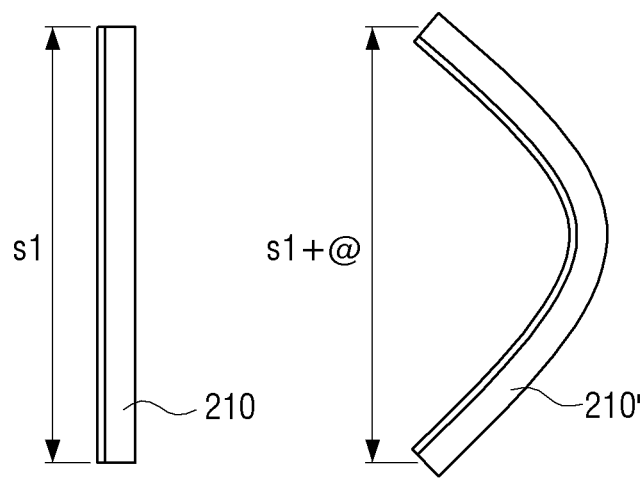
FIG. 23 illustrates a strap according to an embodiment of the present disclosure.

FIG. 23 illustrates a strap 210 according to an embodiment of the present disclosure.

Referring to FIG. 23, the strap 210 has a length S1 and elasticity. Accordingly, the strap 210' may stretch by as much as a predetermined length S1+@ according to user manipulation and a preset region may be bent.

Similar to the strap 130, the strap 210 may use a soft rubber material and/or materials with high elasticity in order to ensure sufficient strain and restoring force.

In addition, the strap 210 may have a flex sensor positioned therein and detect information on a strap region in which bending occurs and a bending angle at the corresponding region.

Figure 24A:
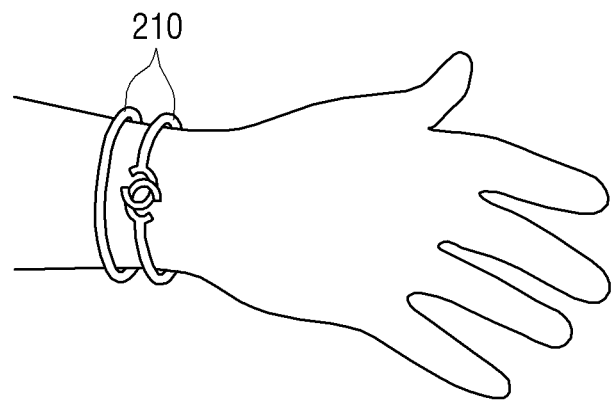
FIGS. 24A and 24B are diagrams for explanation of an interaction using an electronic apparatus according to an embodiment of the present disclosure.
Figure 24B:
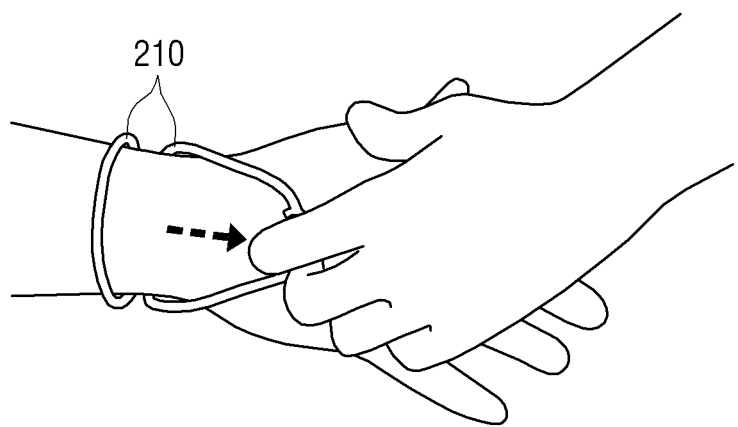

FIGS. 24A and 24B are diagrams for explanation of an interaction using an electronic apparatus according to an embodiment of the present disclosure.

Referring to FIG. 24A, the strap 210 may be wound on the user's wrist. When the user pulls one side of the strap 210, as illustrated in FIG. 24B, a bending angle of the portion of the strap 210 pulled by the user is reduced.

This interaction may be mapped to various functions and may be operated as different functions according to the operating state and operational state of the electronic apparatus. For example, when the electronic apparatus is operatively connected to an external smartphone, this interaction may be used as a command for receiving a telephone call in the smartphone, or a command for activation of a camera function of the external smartphone.

Figure 25:
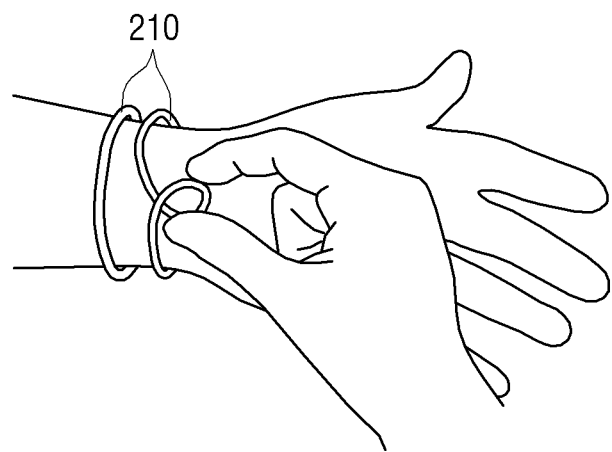
FIGS. 25 to 38 illustrate various interactions using an electronic apparatus according to an embodiment of the present disclosure.

FIG. 25 illustrates a pulling and twisting of a region of a strap by a user.

Referring to FIG. 25, the strap 210 is wound and put on the user wrist. When the user pulls and twists one side of the strap 210, a bending state of the region of the strap is changed. For example, an angle of the region pulled by the user is reduced and a bending angle of another region adjacent to the corresponding region is changed in a different direction from the corresponding region. Accordingly, in response to the change in the different direction being detected with respect to a plurality of adjacent regions, the electronic apparatus determine that the user interaction is input.

This user interaction may be mapped to various functions and may be operated as different functions according to the operating state and operational state of the electronic apparatus. For example, when the electronic apparatus is operatively connected to an external smartphone, this user interaction may be used as a command for rejecting a telephone call in the smartphone.

Figure 26:
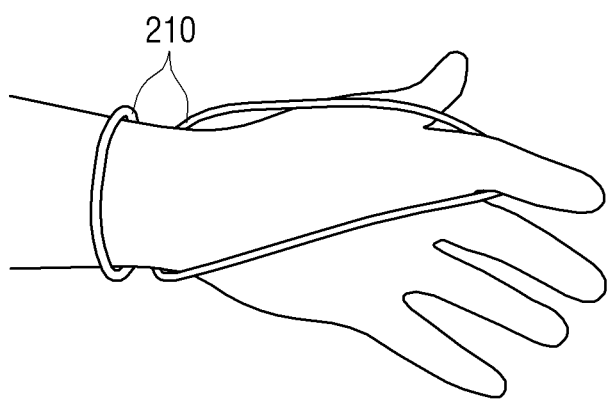

FIG. 26 illustrates a pulling of a region of a strap and allowing the region of the strap to be caught on a finger by a user.

Referring to FIG. 26, the strap 210 is wound on the user's wrist. The user may pull one side of the strap 210 and allow the side to be caught between the fingers. As a result, a bending angle of a specific region is reduced. Although this interaction is similar to the interaction in FIG. 24B, in FIG. 26, the strap 210 is pulled more in order to allow the strap to catch on the user's finger. That is, compared with FIG. 24B, elasticity in the strap 210 may be further increased and an angle at a specific region may be reduced than in FIG. 24B. Accordingly, in response to the characteristics being detected, the electronic apparatus may determine that the user interaction is input.

This user interaction may be mapped to various functions and may be operated as different functions according to the operating state and operational state of the electronic apparatus. For example, when the electronic apparatus is operatively connected to an external smartphone, this user interaction may be used as a command for activation of a camera function of the external smartphone.

Figure 27:
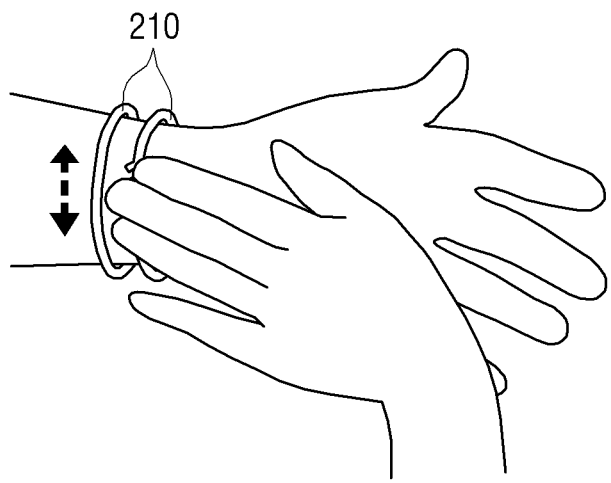

FIG. 27 illustrates rotating a strap by a user.

Referring to FIG. 27, when the user rotates the strap 210, an acceleration sensor and direction sensor in the strap 210 may detect that the strap 210 is rotated. In response to a change in direction information of the strap 210 being detected without a bending change, the electronic apparatus may determine that a user interaction is input.

This user interaction may be mapped to various functions. For example, this user interaction may be used to mute sound of a connected external apparatus.

Figure 28:
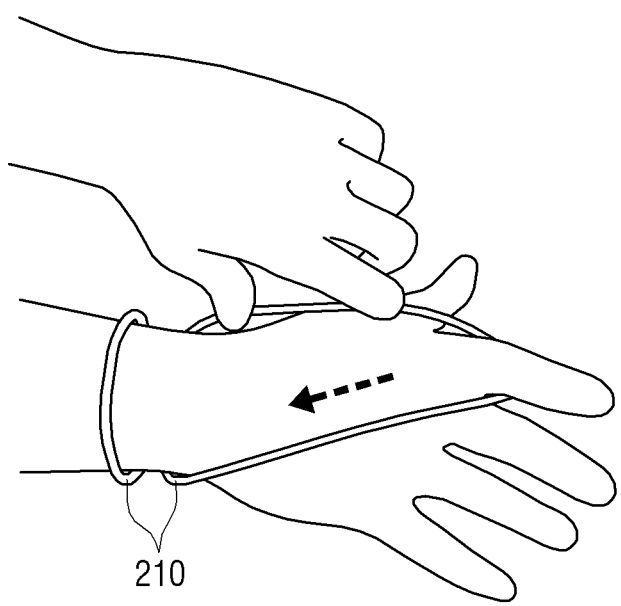

FIG. 28 illustrates pulling a region of a strap and touching the strap in a predetermined direction, while the strap is caught on the finger by a user.

Referring to FIG. 28, the user may pull one side of the strap 210 and allow the side to be caught between the fingers. In this case, an angle of a specific region may be reduced. In the arrangement form, the user may touch an adjacent portion of the specific region, an angle of which is reduced. In response to the aforementioned bending information and touch information being simultaneously input, the electronic apparatus may determine that a user interaction is input.

This user interaction may be mapped to various management states. For example, this user interaction may be used for controlling the volume of a connected electronic apparatus.

In addition, this user interaction may be identified according to a touch position and touch direction of the user.

For example, when a left portion of a specific region is touched, the user interaction may be determined as a command for turning up the volume, and when a right portion of the specific region is touched, the user interaction may be determined as a command for turning down the volume. Alternatively, for a continuous touch moving away from a specific region, the user interaction may be determined as a command for turning up the volume, and for a continuous touch moving closer to the specific region, the user interaction may be determined as a command for turning down the volume.

Figure 29:
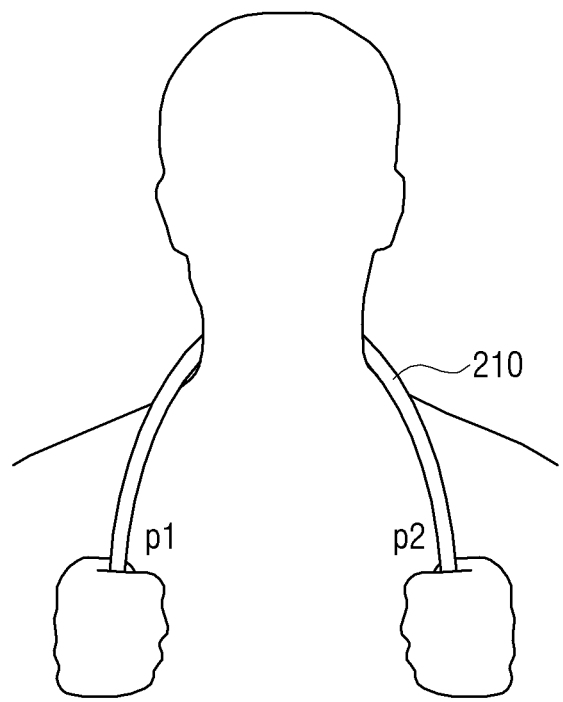

FIG. 29 illustrates an interaction of grabbing two specific regions of a strap by a user.

Referring to FIG. 29, the user may put the strap 210 around the neck or grab opposite ends of the strap 210. A pressure sensor for detection of user grab may be disposed in a specific region of the strap 210. In response to the user grab being detected by two preset pressure sensors, the electronic apparatus may determine the user grab as a user interaction.

This user interaction may be mapped to various functions. For example, this user interaction may be used to connect the electronic apparatus to a specific apparatus (e.g., a television (TV)).

Figure 30:
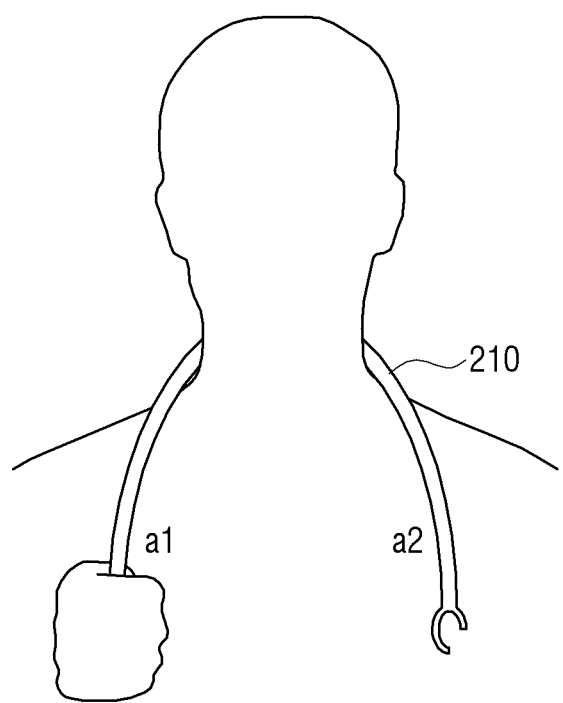

FIG. 30 illustrates an interaction of grabbing two specific regions of a strap by a user.

Referring to FIG. 30, the user may put the strap 210 around the neck or pull one end of the strap 210. A pressure sensor for detection of user grab and an acceleration sensor for detection of movement of the electronic apparatus may be disposed in a specific region of the strap 210. In response to the user grab being detected and movement of the strap in a specific direction being detected by a preset pressure sensor, the electronic apparatus may determine the detected interaction.

This user interaction may be mapped to various management states, e.g., for controlling the volume of a connected apparatus.

Figure 31:
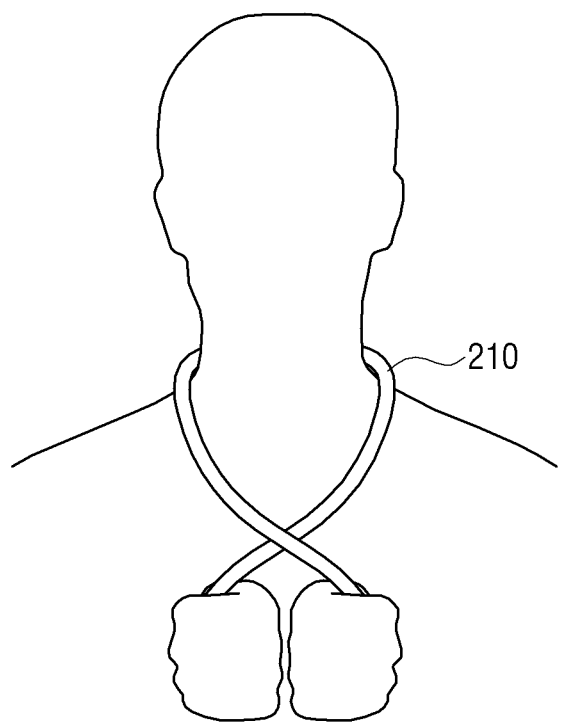

FIG. 31 illustrates an interaction of grabbing two regions of a strap and crossing the regions.

Referring to FIG. 31, the user may put the strap 210 around the neck or grab and cross opposite ends of the strap 210. A pressure sensor for detection of user grab and a flex sensor for detection of bending of a specific region may be disposed in a specific region of the strap 210. In response to the user grab being detected and bending at the specific region of the strap 210 being detected by a preset pressure sensor, the electronic apparatus may identify the detected interaction.

For example, this user interaction may be used as to convert an operating state of a connected apparatus.

Figure 32:
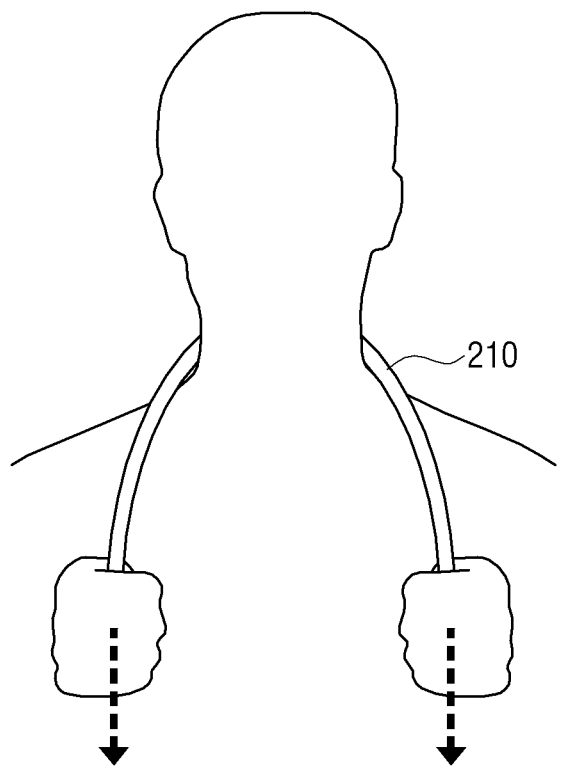
Figure 33:
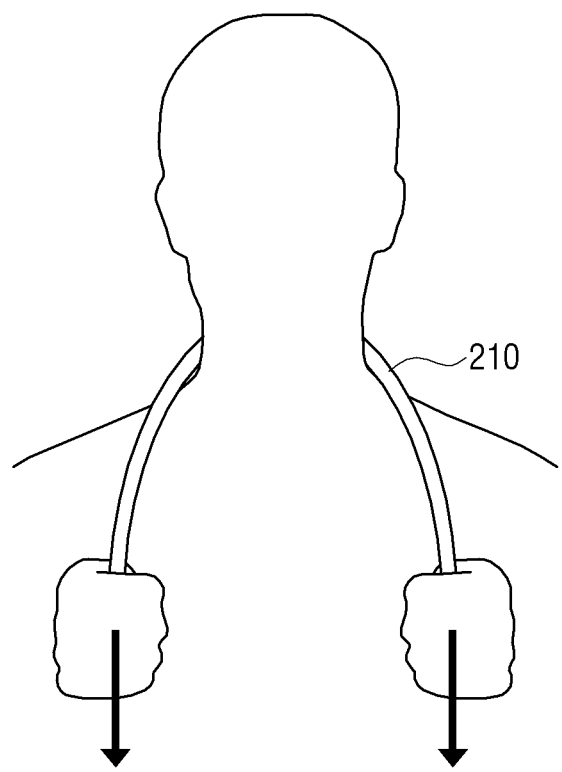

FIGS. 32 and 33 illustrate different user interactions of pulling two specific region of a strap by a user.

Referring to FIG. 32, the user may put the strap 210 around the neck, and the user may pull opposite ends of the strap 210 in a downward direction. A pressure sensor for detection of user grab may be disposed in a specific region of the strap 210 and a flex sensor for detecting that the specific region of the strap 210 is bent may be disposed in the specific region of the strap 210. When the user pulls the strap 210 in a downward direction, a bending state of a user neck part may be changed. In response to user grab being detected and bending at the specific region of the strap is detected by a preset pressure sensor, the electronic apparatus identify the user interaction. For example, this user interaction may be used for receiving a phone call of a connected smartphone or (or pausing) an image of a connected apparatus.

Referring to FIG. 33, the electronic apparatus identify the user interaction in the same way as in FIG. 32, except that the electronic apparatus differentiates the user interactions according to the speed in which the strap 210 is bent. The bending in FIG. 33 happens faster than the bending in FIG. 32.

For example, the user interaction in FIG. 33 may be used to turn ringing off or reject a phone call of a connected smart phone, or start or terminate an image of a connected apparatus.

Figure 34:
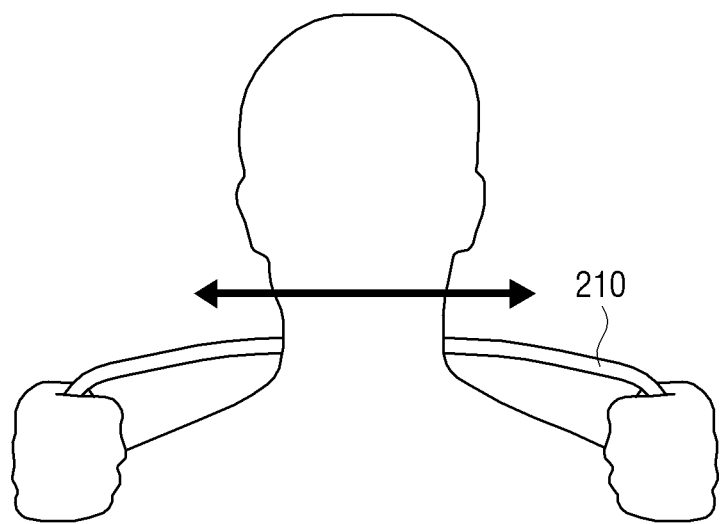

FIG. 34 illustrates an interaction of pulling two specific regions of a strap toward the user's shoulders.

Referring to FIG. 34, a user may put the strap 210 around the neck and may pull opposite ends of the strap 210 to the left and right. A pressure sensor for detection of user grab in the specific region and a flex sensor for detection of bending of a specific region may be disposed in a specific region of the strap 210. When a user pulls the strap 210 to the left and right, an angle of a bent region may be increased compared with a conventional case. Accordingly, when the electronic apparatus detects the user grab in a preset pressure sensor and detects a change in a bending degree at a specific region of a strap, the electronic apparatus may identify the user interaction.

For example, this user interaction may be used as to mute the volume of a connected smartphone or convert a sound output method of a connected apparatus.

Figure 35:
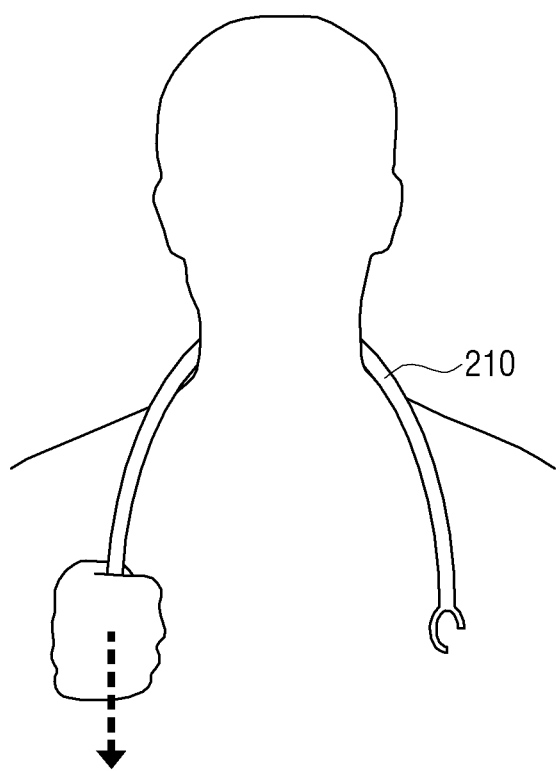

FIG. 35 illustrates an interaction of grabbing a predetermined region of a strap and pulling the strap by a user.

Referring to FIG. 35, the user may put the strap 210 around the neck and may grab and twist one end of the strap 210. A pressure sensor for detection of user grab may be disposed in a specific region of the strap 210 and an acceleration sensor for detection of movement of the electronic apparatus may be disposed in the strap 210. When the electronic apparatus detects the user grab only in one preset pressure sensor and detects movement in a specific direction (i.e., a different direction from an arrangement direction of the strap) of the strap 210, the electronic apparatus may identify the user interaction.

For example, this user interaction may be used to terminate a connection with a connected apparatus.

Figure 36:
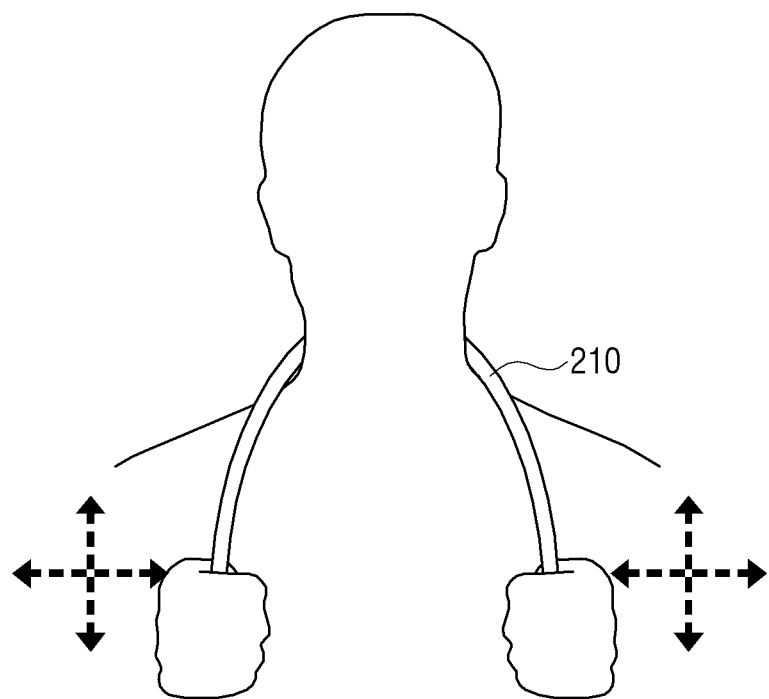

FIG. 36 illustrates an interaction of grabbing opposite ends of a strap and manipulating the opposite ends like a joystick by a user.

Referring to FIG. 36, acceleration sensors may be separately arranged at the opposite ends of the strap 210. Accordingly, the user may put the strap 210 around the neck and use the opposite ends of the strap 210 like a joystick. When an operation of a connected apparatus is a game and the user's grab is detected in the two preset pressure sensors, the electronic apparatus may identify the user interaction. Further, the direction manipulation of the user may correspond to a joystick and may also be performed to correspond to various moving forms.

Figure 37:
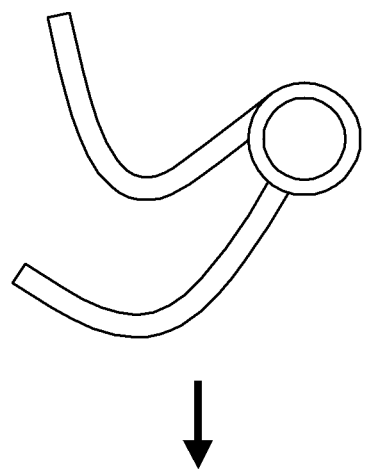
Figure 37:
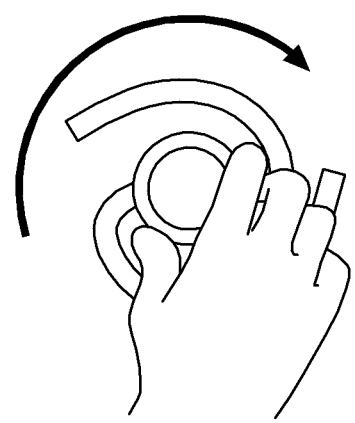

FIG. 37 illustrates a user interaction of rotating an electronic apparatus on a surface.

Referring to FIG. 37, an acceleration sensor may be disposed in each of the electronic apparatus. Accordingly, a user may perform manipulation of rotating an electronic apparatus based on a specific position. Upon detecting that the strap rotates in a specific direction, the electronic apparatus may identify a user interaction.

For example, this user interaction may be used to change an operating state of an electronic apparatus to a home state (or a default state).

Figure 38:
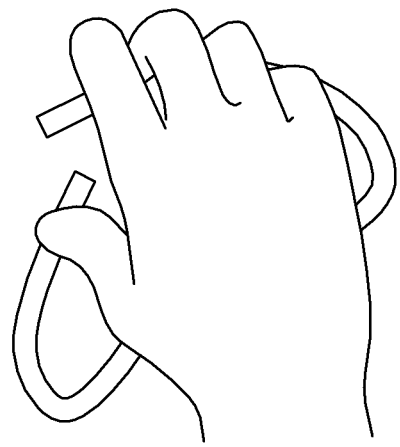

FIG. 38 illustrates a user interaction of grabbing an electronic apparatus.

Referring to FIG. 38, a user may perform an interaction of grabbing a strap of the electronic apparatus. In response, the electronic apparatus may detect that bending occurs in a plurality of regions of the strap. Accordingly, upon detecting that bending occurs in a plurality of regions of the strap, the electronic apparatus may identify a user interaction.

For example, this user interaction may be mapped to a function of pausing a connected apparatus.

Figure 39:
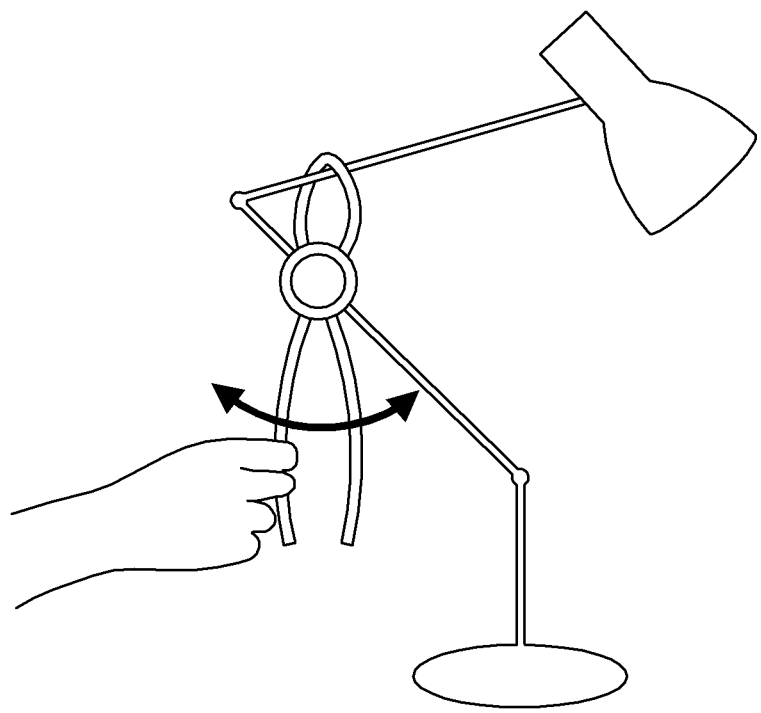
FIGS. 39 and 40 illustrate various uses of an electronic apparatus according to an embodiment of the present disclosure.
Figure 40:
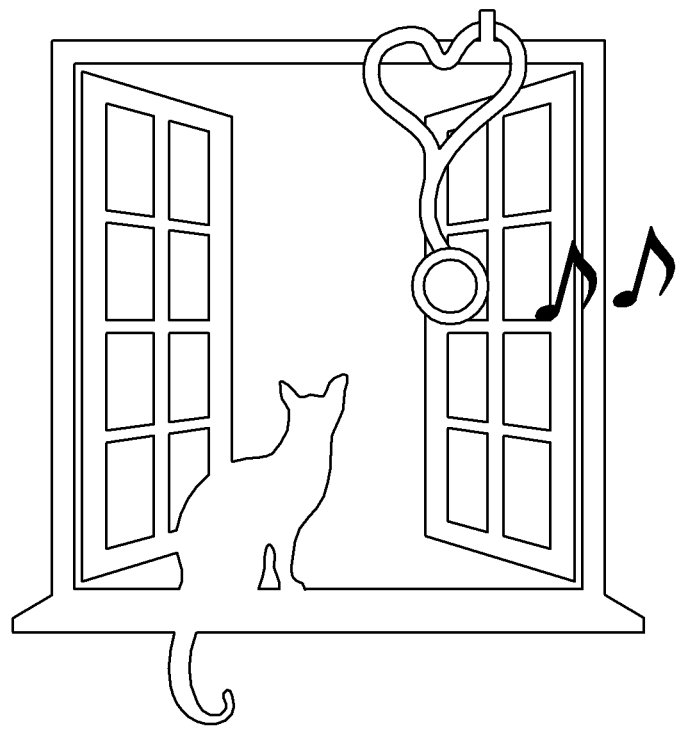

FIGS. 39 and 40 illustrate other use of an electronic apparatus according to an embodiment of the present disclosure.

Referring to FIG. 39, the electronic apparatus may be hung on an object. In this case, a user may turn on a screen of the electronic apparatus by shaking the electronic apparatus. The electronic apparatus may signal message reception and so on through sound indication.

Referring to FIG. 40, a strap may be bent into a specific shape, which may control the electronic device to continuously output a preset sound.

Figure 41:
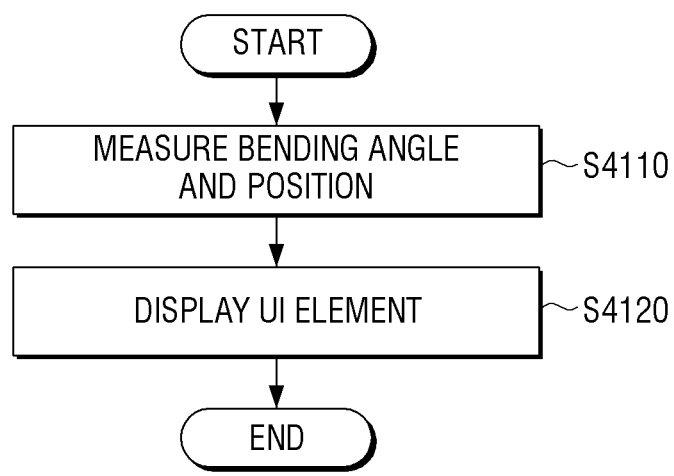
FIG. 41 is a flowchart illustrating a method of controlling an electronic apparatus according to an embodiment of the present disclosure.

FIG. 41 is a flowchart illustrating a method of controlling an electronic apparatus according to an embodiment of the present disclosure.

Referring to FIG. 41, in step S4110, a position and angle at which a strap is bent is measured, e.g., based on information transmitted from a flex sensor in the strap.

In step S4120, a UI element corresponding to the measured position and angle is displayed. For example, a user interaction corresponding to the measured position and angle may be detected and a UI element corresponding to the detected user interaction may be displayed.

According to the above-described embodiments, an electronic device including a strap may receive various interactions of a user by detecting a bending state of the strap. In addition, various functions corresponding to the input various interactions may be provided.

The aforementioned controlling method may be embodied as a program (or application) executable in a computer and the program may be provided and stored in a non-transitory computer readable medium.

The non-transitory computer readable medium is a medium that semi-permanently stores data and from which data is readable by a device. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), etc., and may be provided.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic apparatus comprising:
   a strap;
   a sensor;
   a display; and
   a processor configured to:
   obtain a position and an angle at which the strap is bent from the sensor;
   identify a user interaction based on the obtained position, the obtained angle and a position of the display; and
   control the display to display a user interface (UI) element based on the user interaction.

2. The electronic apparatus of claim 1, wherein the strap comprises a flexible wire for maintaining a shape of the strap, and
   wherein the sensor comprises a flex sensor.

3. The electronic apparatus of claim 1, wherein the sensor comprises a position sensor configured to obtain a relative position between the strap and the display, and
wherein the processor is further configured to identify the user interaction based on the obtained position, the obtained angle, and the obtained relative position.

4. The electronic apparatus of claim 3, wherein the processor is further configured to identify a wearing form of the electronic apparatus based on the detected relative position.

5. The electronic apparatus of claim 3, wherein the processor is further configured to identify an operating state of the electronic apparatus based on the obtained relative position.

6. The electronic apparatus of claim 5, wherein the processor is further configured to identify a number of straps disposed in a same direction based on the obtained relative position, and identify an operating state of the electronic apparatus based on the number of the straps.

7. The electronic apparatus of claim 5, wherein the processor is further configured to displays the UI element corresponding to the identified operating state and the identified user interaction on the display.

8. The electronic apparatus of claim 3, wherein the position sensor comprises a plurality of magnets disposed in the strap and a plurality of hall sensors disposed in the display.

9. The electronic apparatus of claim 3, wherein the position sensor comprises a plurality of hall sensors disposed in the strap and a plurality of magnets disposed in the display.

10. The electronic apparatus of claim 1, further comprising a touch portion configured to detect a user touch,
wherein the processor is further configured to identify a user interaction corresponding to the obtained position and the obtained angle only when a user touch is detected.

11. An electronic apparatus comprising:
a strap;
a sensor;
a communicator;
a display;
a processor configured to:
obtain a position and an angle at which the strap is bent from the sensor;
identify a user interaction based on a relative position of opposite ends of the strap, the obtained position, the obtained angle, and a position of the display; and
control the communicator to transmit a control command corresponding to the identified user interaction to another electronic apparatus.

12. The electronic apparatus of claim 11, wherein the strap comprises a flexible wire for maintaining a shape of the strap, and
wherein the sensor comprises a flex sensor.

13. The electronic apparatus of claim 11, wherein the sensor comprises a position sensor configured to obtain the relative position of opposite ends of the strap.

14. The electronic apparatus of claim 11, wherein the sensor comprises at least one of a direction sensor and an acceleration sensor, to obtain direction information of the electronic apparatus, and
wherein the processor is further configured to identify the user interaction based on the obtained direction information of the electronic apparatus.

15. The electronic apparatus of claim 11, further comprising a microphone configured to receive a sound wave to generate voice data,
wherein the processor is further configured to control the communicator to transmit the generated voice data to the another electronic apparatus.

16. The electronic apparatus of claim 11, wherein the communicator is further configured to receive voice data from the another electronic apparatus, and
wherein the electronic apparatus further comprises a speaker configured to output the received voice data.

17. A method of controlling an electronic apparatus including a strap and a display, the method comprising:
obtaining a position of the strap and an angle at which the strap is bent;
identifying a user interaction based on the obtained position, the obtained angle and a position of the display; and
displaying a user interface (UI) element based on a UI.

18. The method of claim 17, further comprising obtaining a user touch gesture,
wherein the displaying comprises displaying a UI element corresponding to the obtained position, the obtained angle and the position of the display only when the user touch gesture is obtained.

* * * * *

UNITED STATES PATENT AND TRADEMARK OFFICE
CERTIFICATE OF CORRECTION

PATENT NO. : 10,089,007 B2
APPLICATION NO. : 15/184541
DATED : October 2, 2018
INVENTOR(S) : Yeon-hee Jung et al.

Page 1 of 1

It is certified that error appears in the above-identified patent and that said Letters Patent is hereby corrected as shown below:

In the Claims

In Column 22, Claim 17, Line 3:
"obtaining a position of the strap and an angle at which the"
Should be:
-- obtaining a position and an angle at which the --

Signed and Sealed this
Twenty-ninth Day of January, 2019

Andrei Iancu
*Director of the United States Patent and Trademark Office*